United States Patent [19]

Weaver et al.

[11] Patent Number: 5,447,407
[45] Date of Patent: Sep. 5, 1995

[54] LARGE CONTAINER STORING AND DISPENSING MODULE ASSEMBLIES FOR A VEHICLE

[75] Inventors: Roger G. Weaver, Arcadia; Randolph K. Takata, Valencia; Steven C. Finn, Visalia, all of Calif.

[73] Assignee: McKesson Corporation, San Francisco, Calif.

[21] Appl. No.: 14,662

[22] Filed: Feb. 8, 1993

[51] Int. Cl.⁶ .............................................. B65G 67/02
[52] U.S. Cl. ..................... 414/528; 414/498; 414/276; 414/331; 414/608; 414/911; 198/797; 193/27; 220/1.5; 312/72; 312/97; 312/350; 312/319.5
[58] Field of Search ............. 198/797; 193/27, 32, 193/1.5; 220/1.5; 312/73, 72, 91, 97, 134, 319.5, 350; 221/12, 23, 76, 27, 82–85, 124, 194, 218, 295; 414/498, 528, 467, 331, 276, 507, 399, 499, 500, 527, 537, 403, 910, 911, 143.2, 391, 392, 608

[56] References Cited

U.S. PATENT DOCUMENTS

| 1,270,755 | 6/1918 | Holmberg | 198/797 X |
| 1,302,631 | 5/1919 | Buck | 198/797 X |
| 1,753,914 | 4/1930 | Badge et al. | 198/797 |
| 1,859,076 | 5/1932 | Dietrich | 414/399 |

FOREIGN PATENT DOCUMENTS 571557 10/1958 Belgium .................... 198/797

78924 5/1983 Japan ..................... 414/528

Primary Examiner—Frank E. Werner
Attorney, Agent, or Firm—Flehr, Hohbach, Test, Albritton & Herbert

[57] ABSTRACT

A modular storing and dispensing assembly (20) for a plurality of large containers (21) of substantial weight. The modular assembly (20) comprises a container support track mechanism (24) supporting the containers (21) for movement toward a dispensing station (26). An enclosure (27) substantially encloses the track mechanism (24) and all of the containers (21). The track mechanism (24) and the enclosure (27) are both coupled to a modular frame (32) for movement thereof as a unit. The modular frame (32) is mounted on a vehicle (23) and can be used as a free-standing storing and dispensing unit. In an embodiment, the track mechanism (24) includes a conveyor-type assembly (35) extending about a predetermined path (34) substantially along the full transverse dimension of the vehicle (23). The conveyor mechanism (35) includes a conveyor drive mechanism (105) and a flexible transport device (111) movably coupled to the drive mechanism (105). A plurality of carrying trays (36) carry the containers (21) therein and are pivotally coupled to the conveyor transport device (111). Further, load-bearing rails (118, 118') are provided which engage and support the conveyor transport device (111) for support of a substantially portion of the weight of the containers (21).

14 Claims, 13 Drawing Sheets

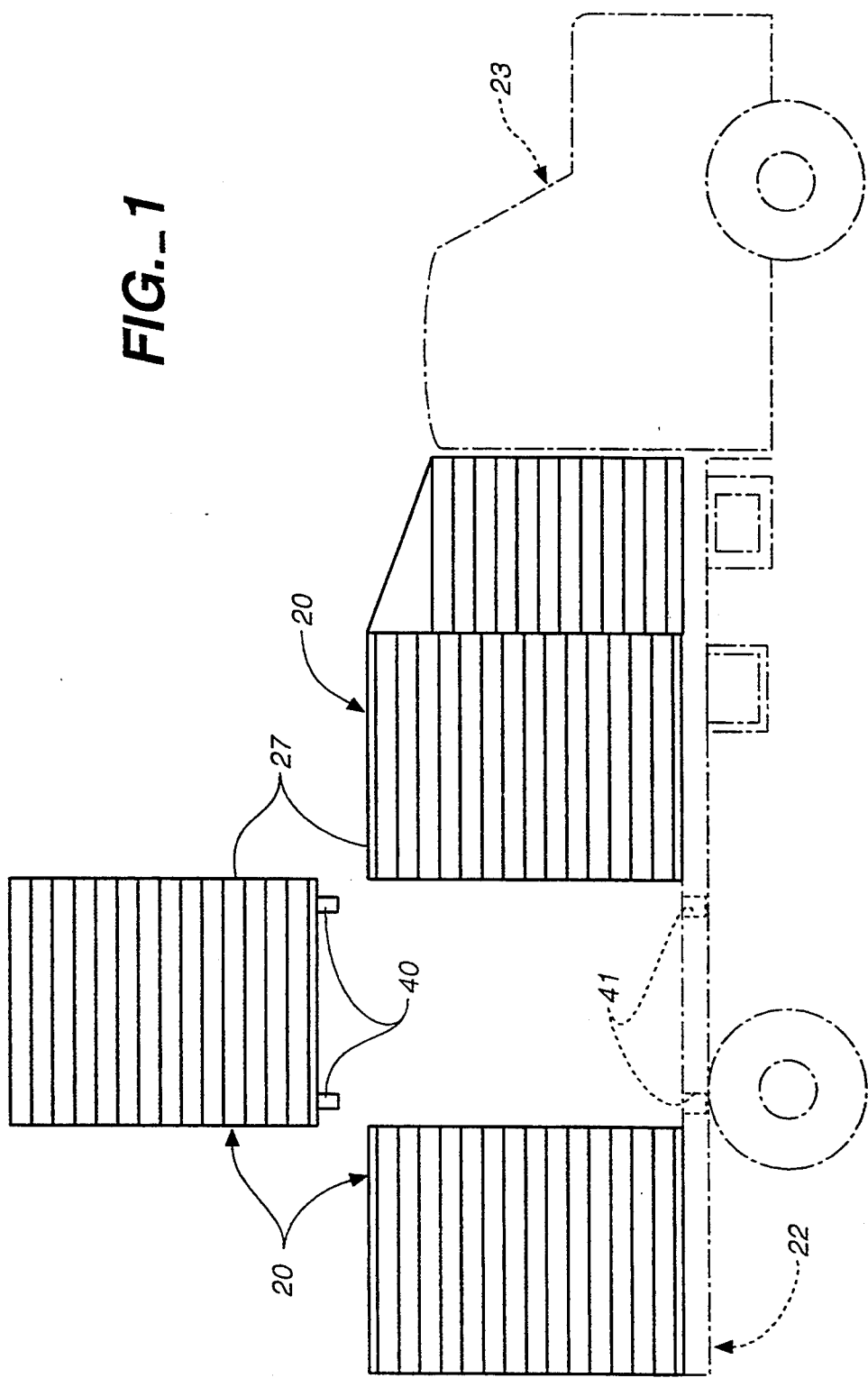

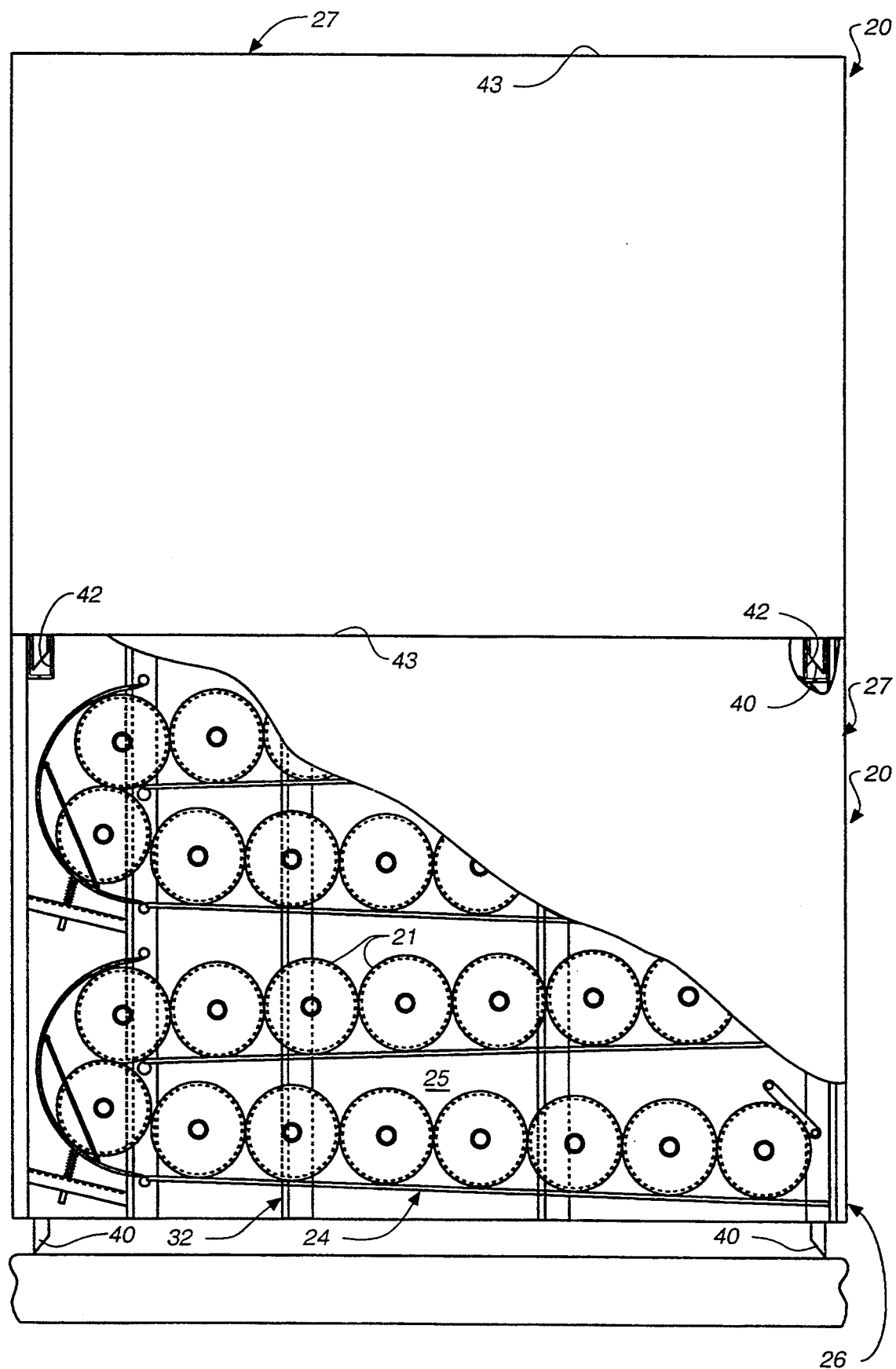
FIG._2

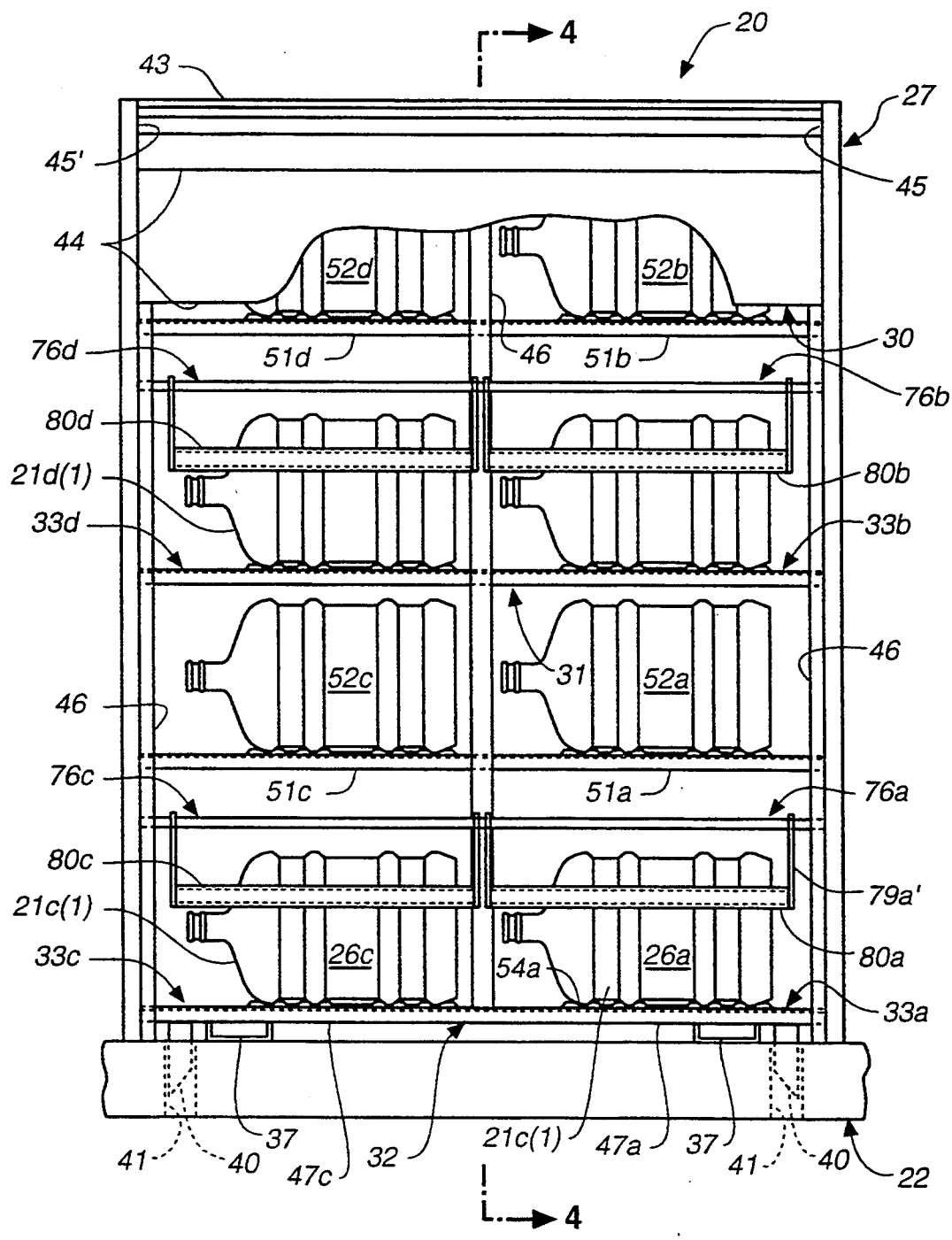
FIG._3

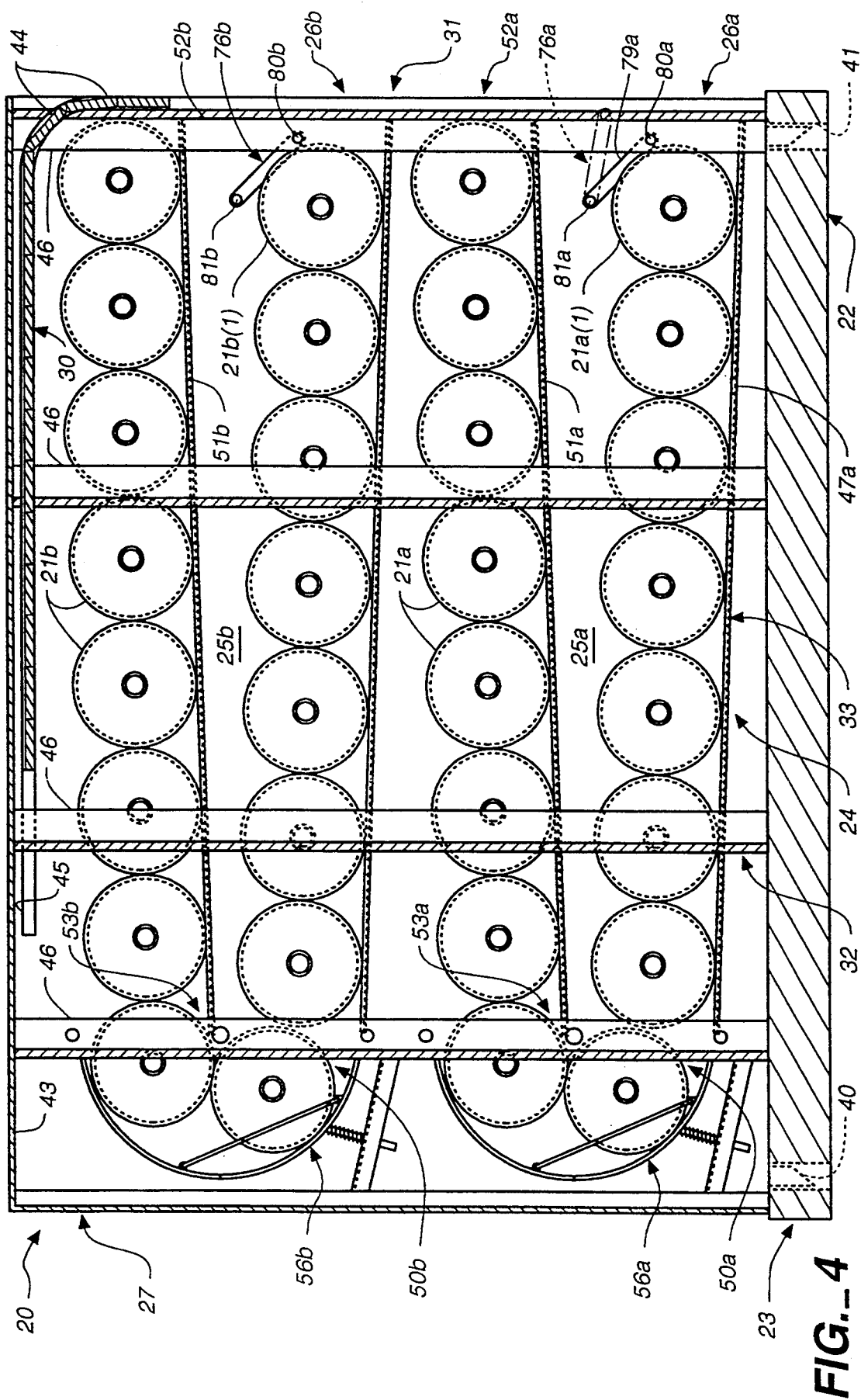
FIG._4

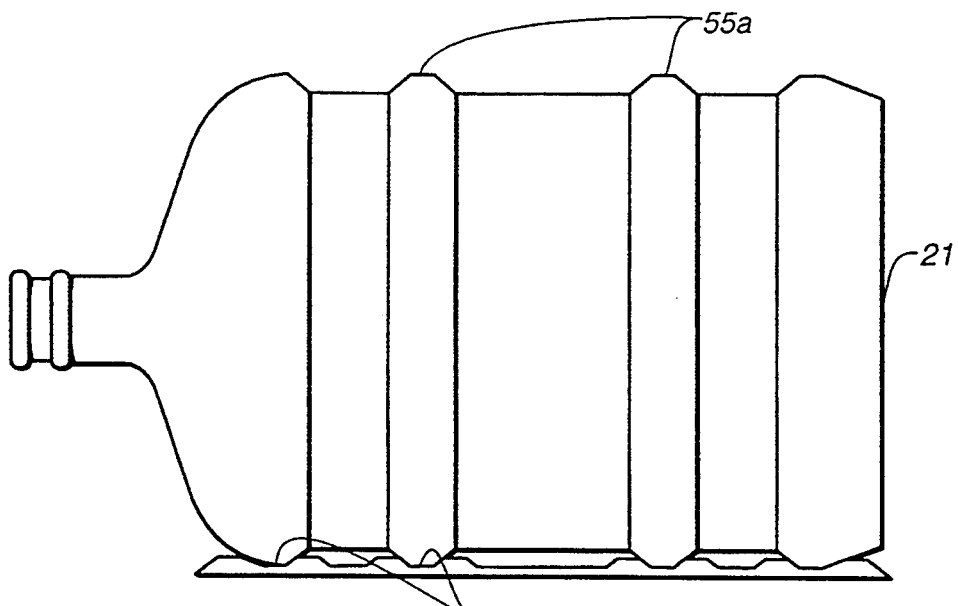
FIG._5
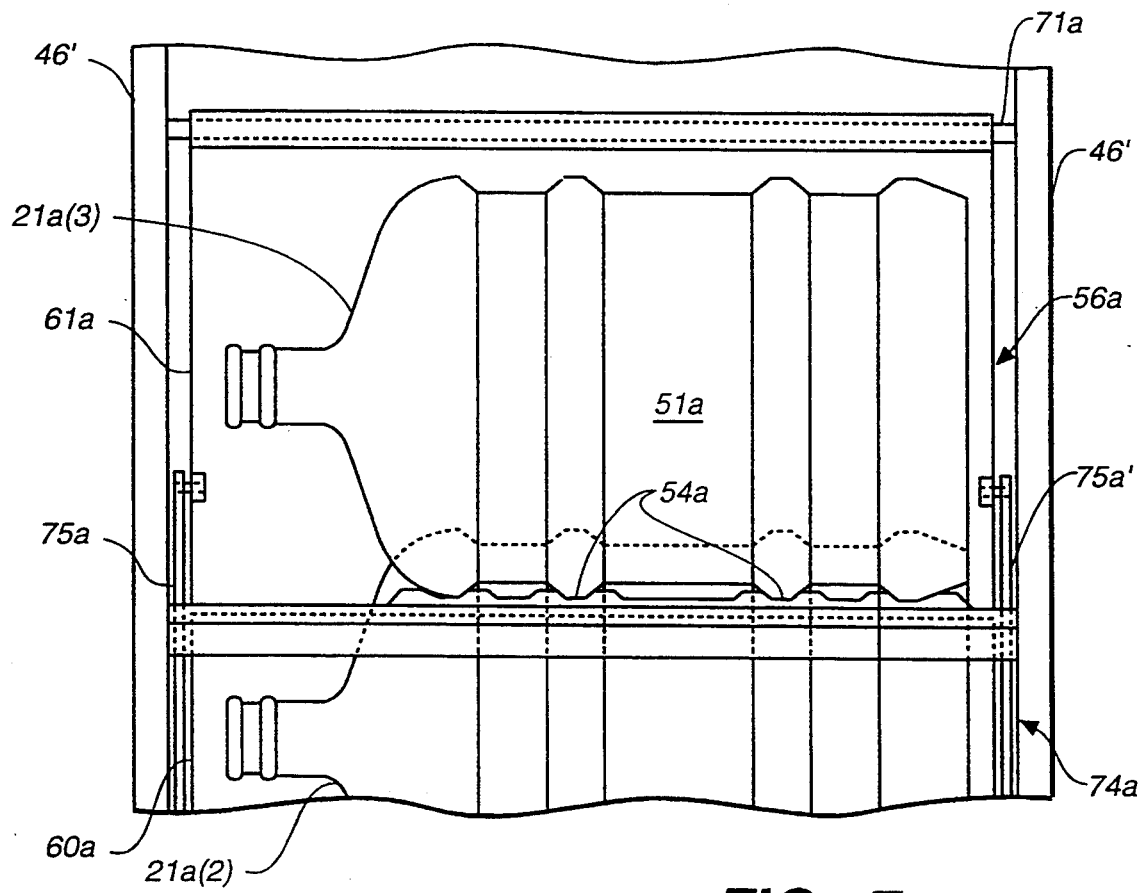
FIG._7

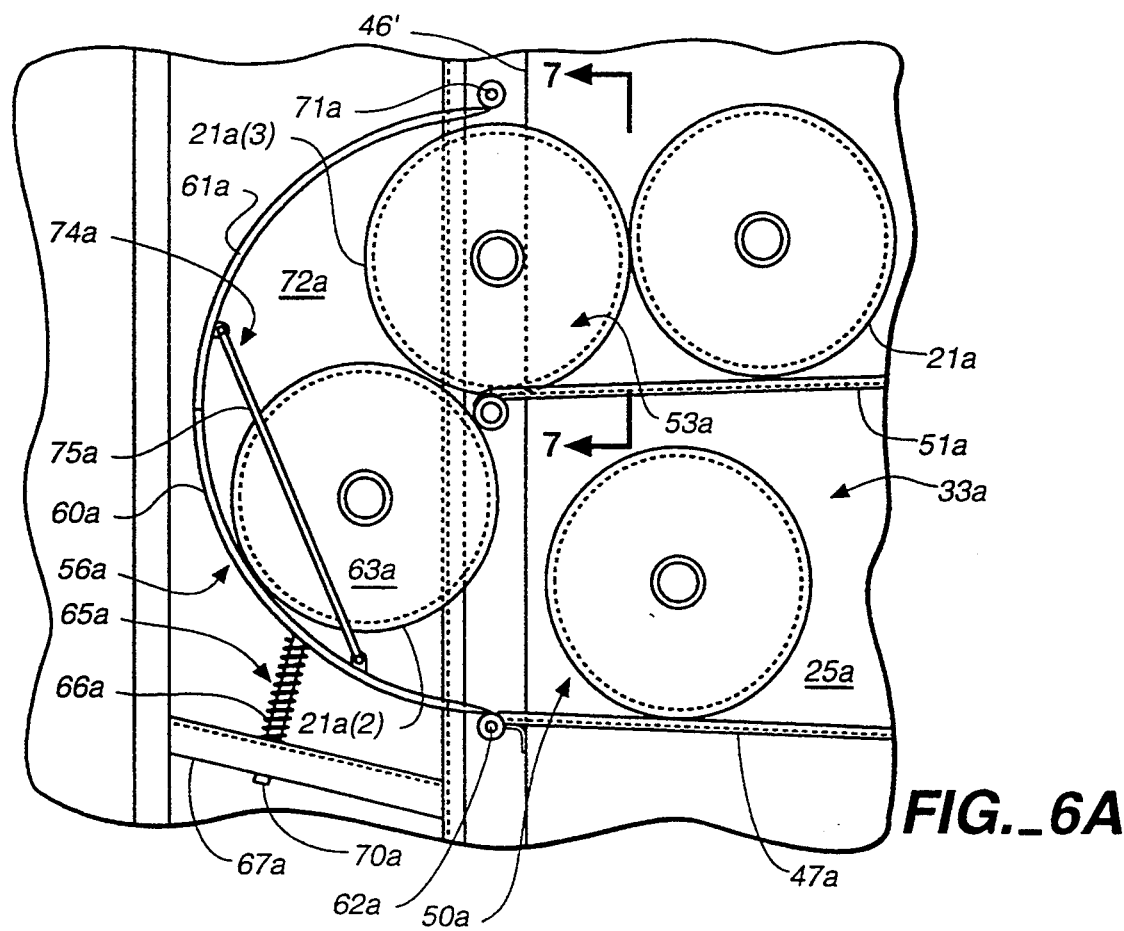
FIG._6A
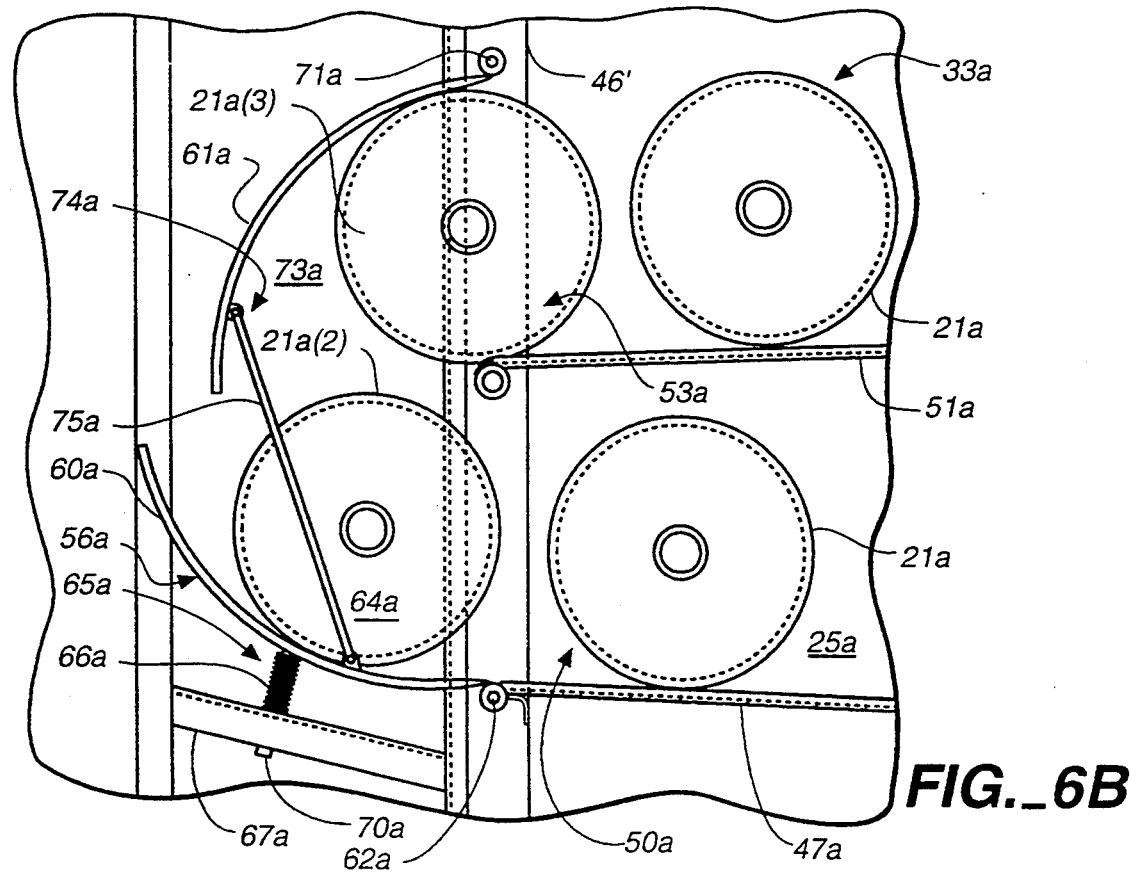
FIG._6B

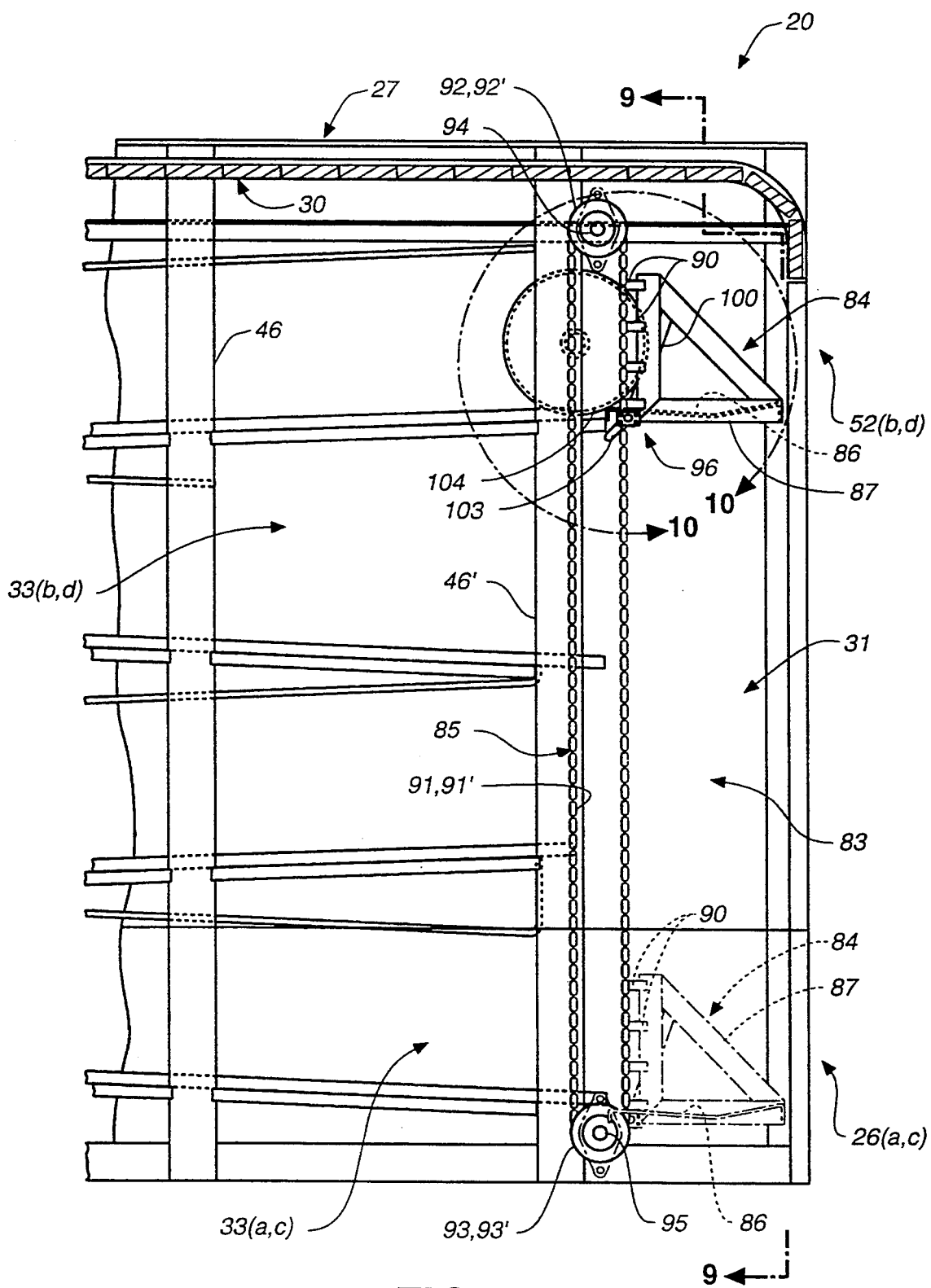
FIG._8

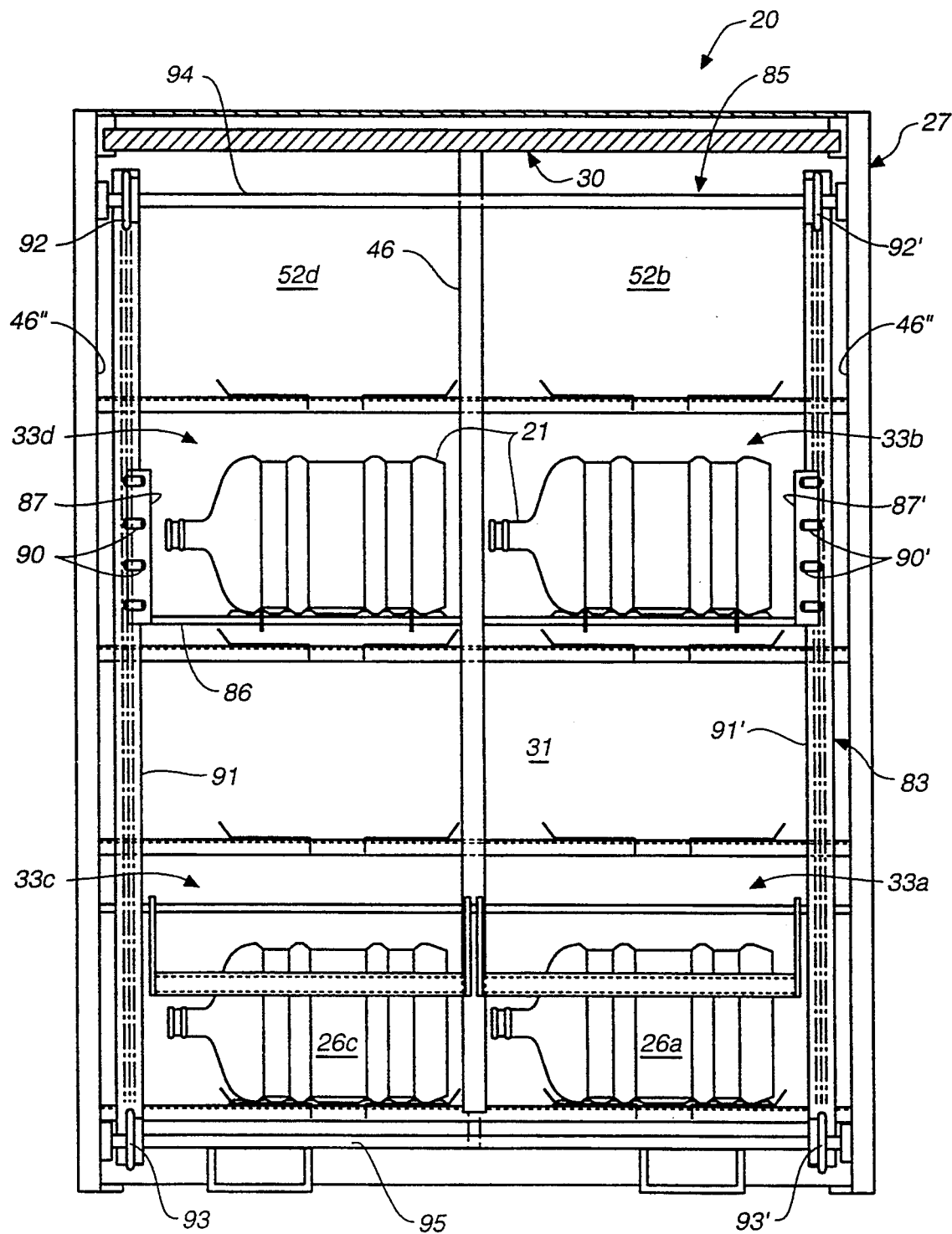
FIG._9

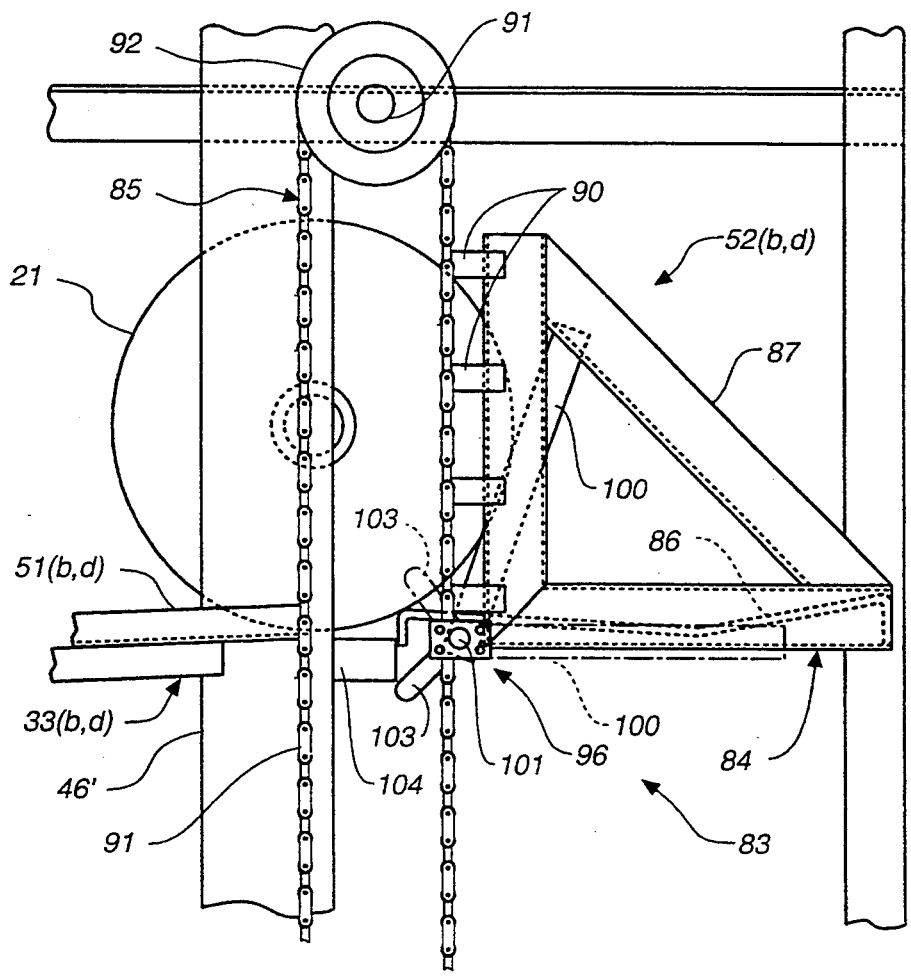
FIG._10
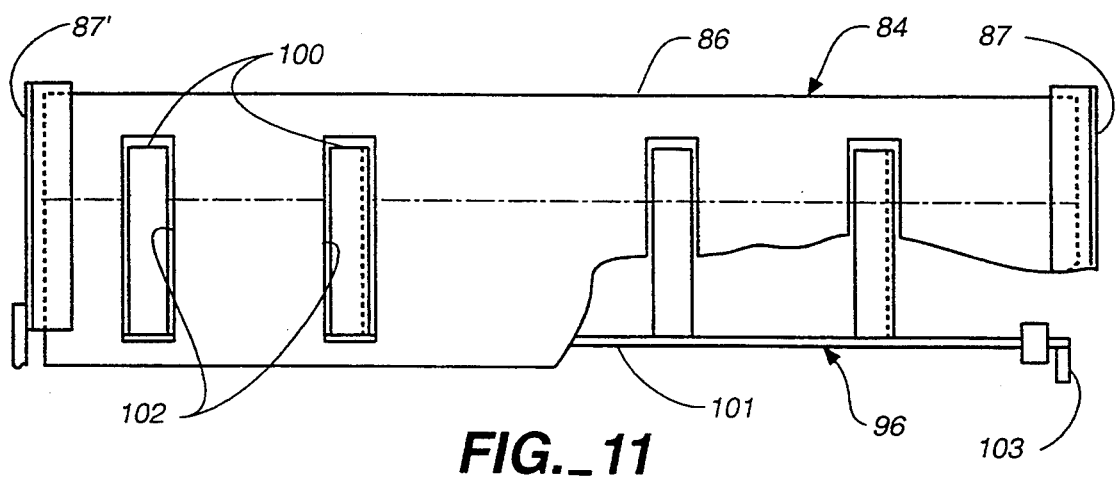
FIG._11

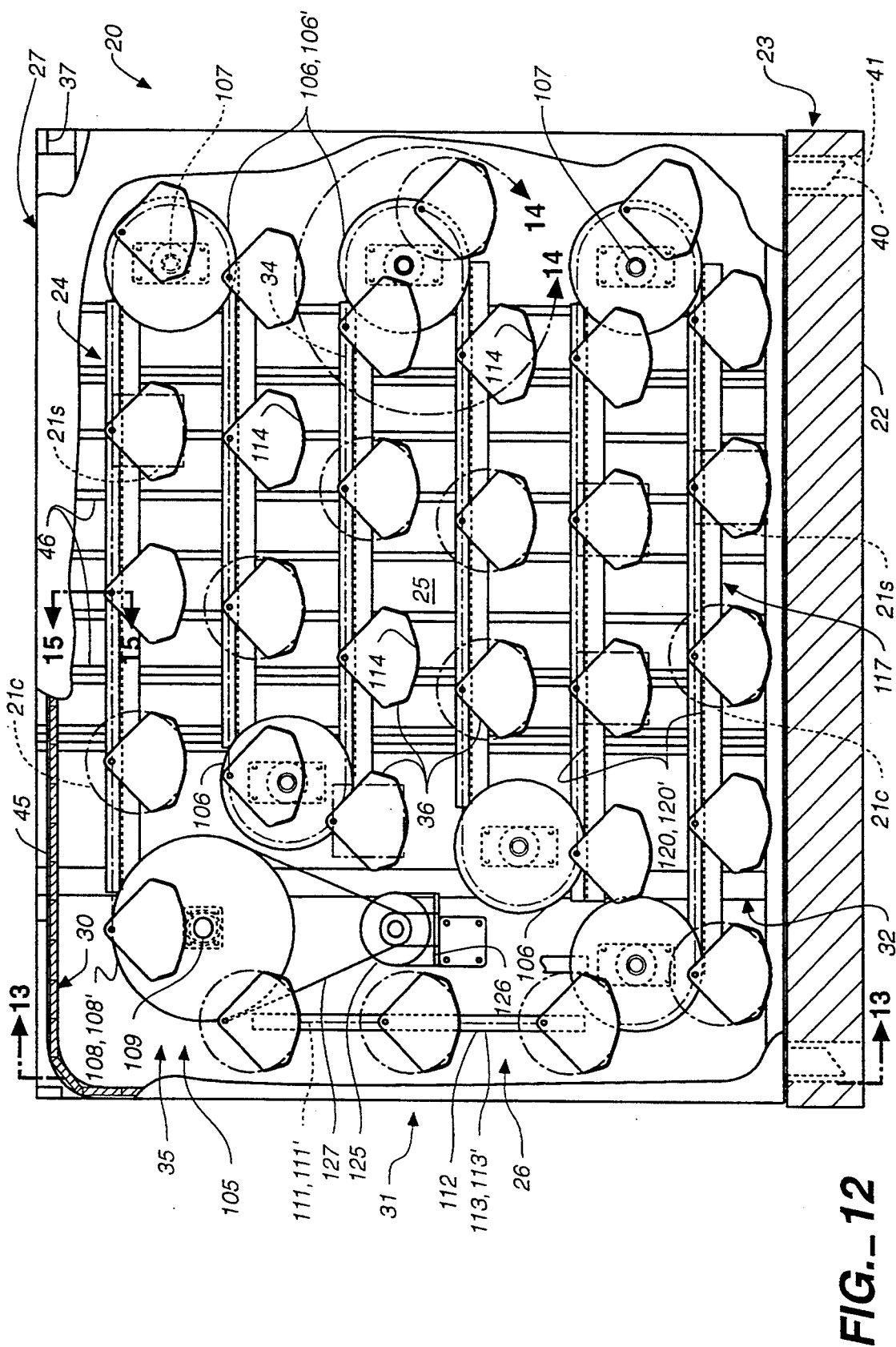
FIG._12

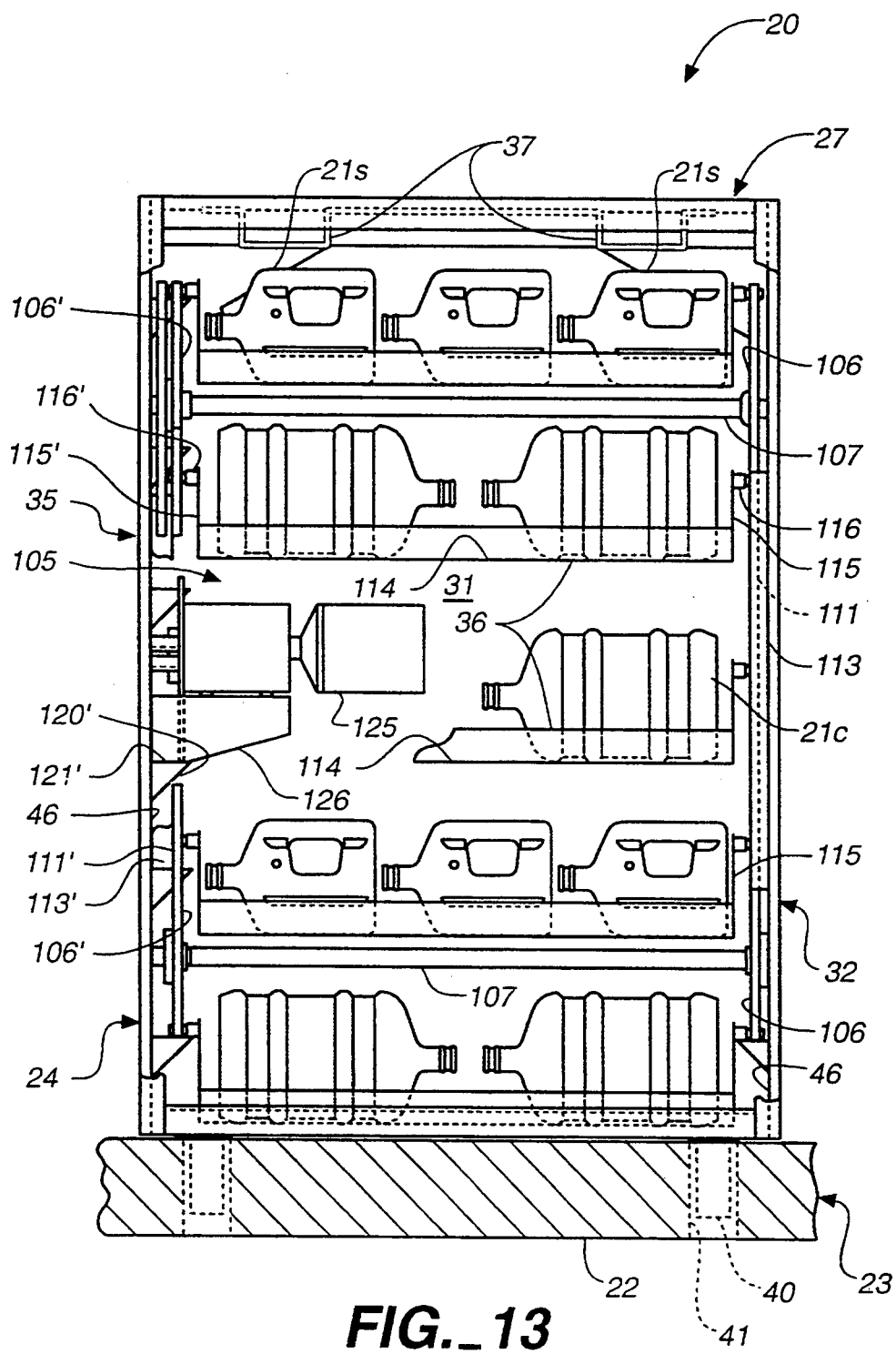
FIG._13

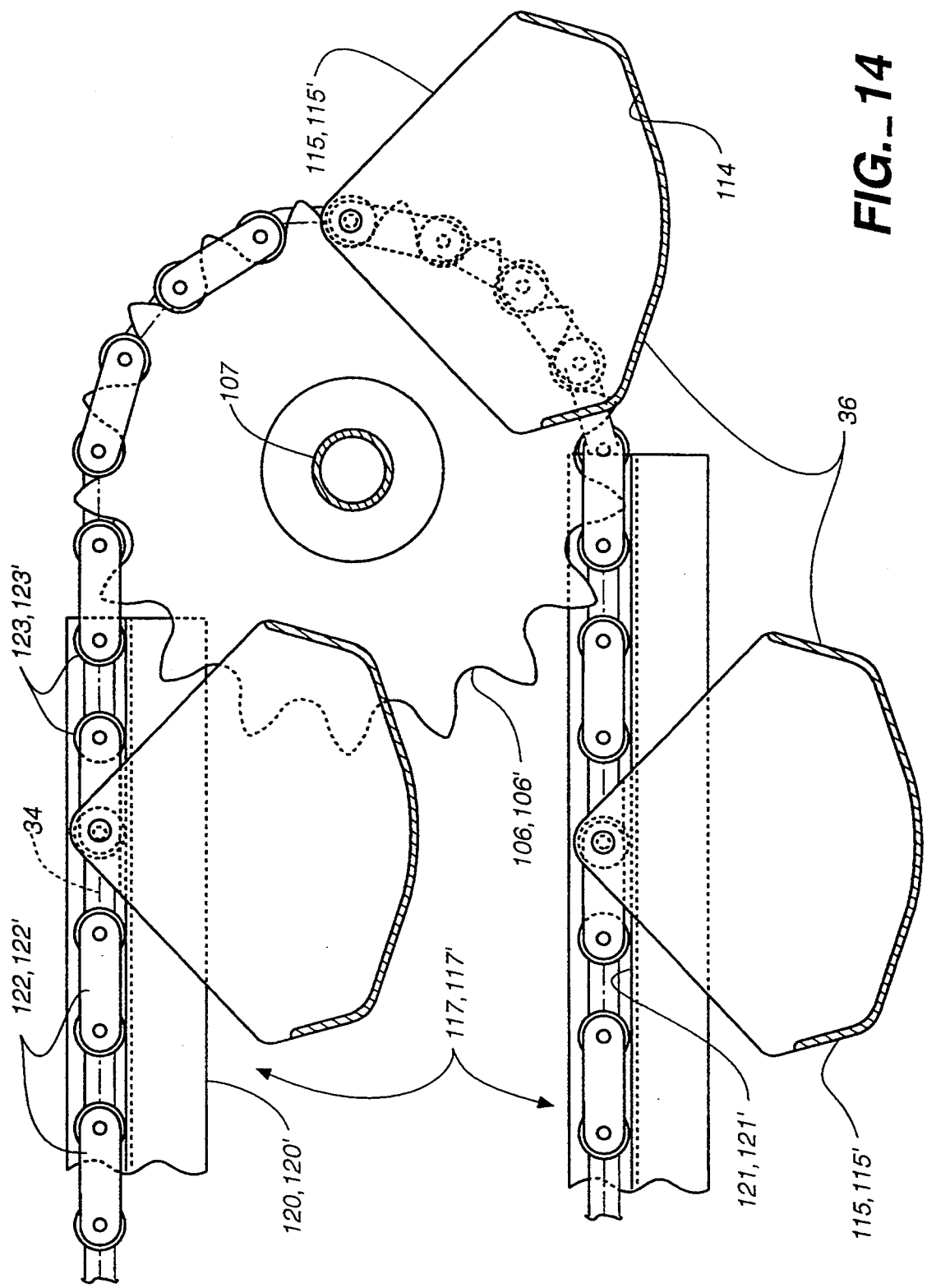
FIG._14

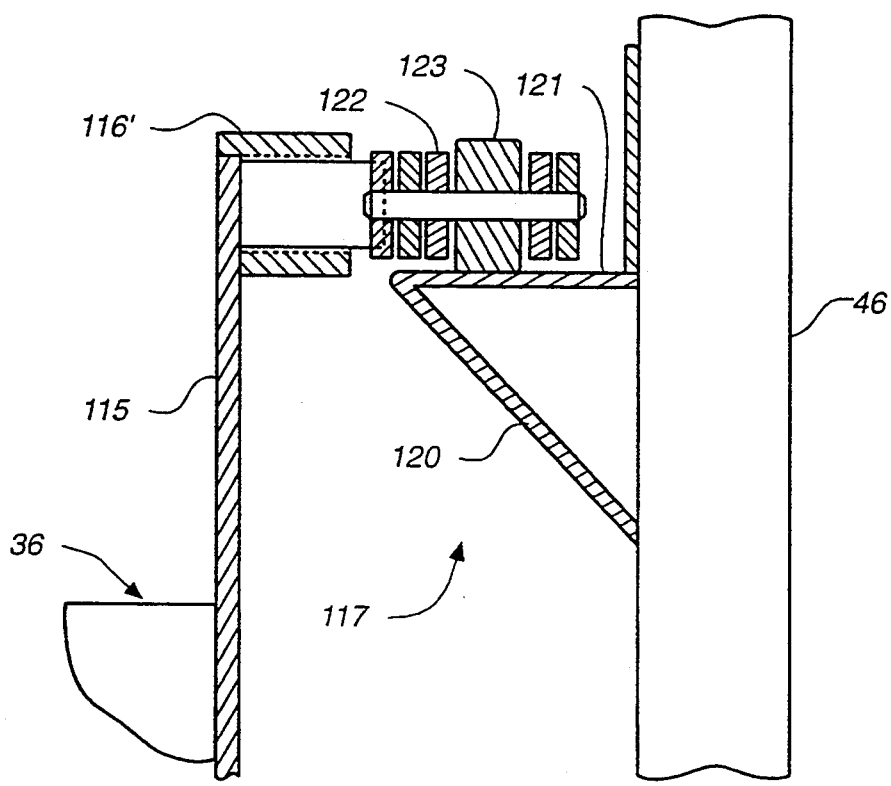
FIG._15
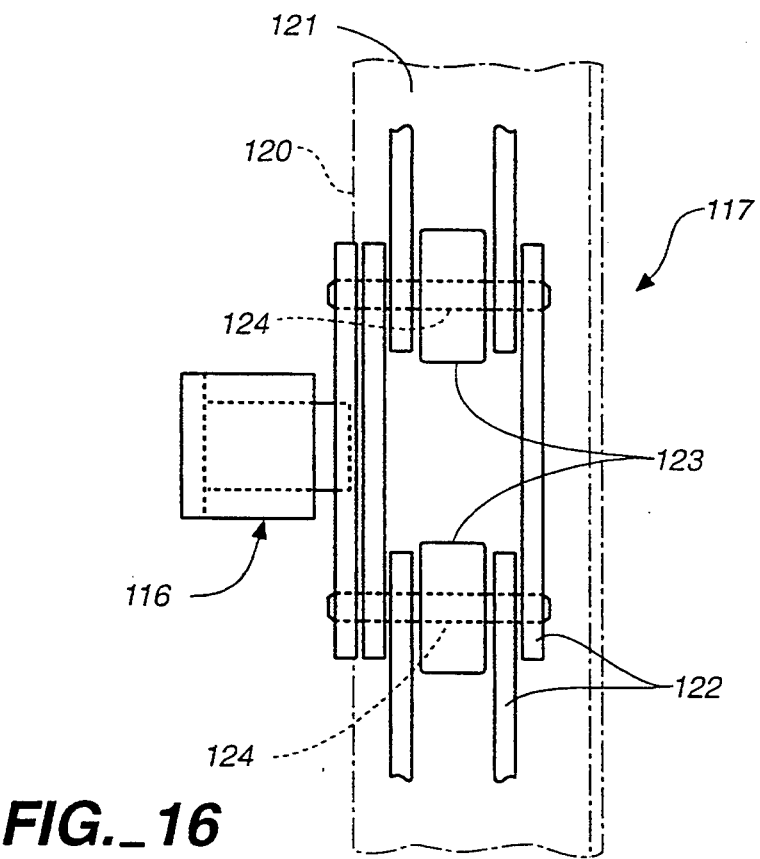
FIG._16

LARGE CONTAINER STORING AND DISPENSING MODULE ASSEMBLIES FOR A VEHICLE

TECHNICAL FIELD

The present invention relates, generally, storage and delivery assemblies for large containers and, more particularly, storing and dispensing module assemblies for large fluid containers adapted to mount to vehicles.

BACKGROUND ART

In the past, the transportation and storage of large fluid containers by delivery vehicles have proven to be difficult, time consuming and expensive to operate. Moreover, delivery personnel are susceptible to serious injury during loading or unloading of these large containers, such as keg containers or water bottles, into or from storage apparatus found on most delivery vehicles.

Typically, 3–5 gallon water containers, having a base portion and an oppositely facing neck portion (the type adapted for use with most bottled water dispensers), are stored in milk carton-type carrying crates oriented on a side portion thereof. Each crate includes an open end which is formed and dimensioned to receive the base portion of the container so that the neck portion faces away from the open end of the crate. To promote storage and transportation, these crates are stacked and coupled together in an array with the open ends of the crates facing outward for receipt of the water containers. These assembled storage arrays or crate rack systems are typically about five crates high and about 3 crates across, and are placed on pallets to facilitate placement of the loaded crate racks onto delivery vehicles.

Specially designed storage bays face outward from opposite sides of the vehicle and are formed to receive pallet mounted crate racks at orientations allowing open access to the water containers stored therein. Hence, water containers facing outward from the respective storage bays can be retrieved from both the driver side of the vehicle and the passenger side. Moreover, loading and unloading of the carrying pallets into or from the storage bays is relatively simple when employing forklifts or the like. These crates are often positioned two-deep on a palate within the storage bays in an effort to maximize space efficiency and increase the payload.

While such a configuration is advantageous in that it permits dense packing of the water containers, provide easy loading of the pallet mounted crate racks into the storage bay and, further, provide wide open access to most water containers, several serious problems are associated with these assemblies. For example, the full water containers are usually systematically removed from one side of the vehicle until that region is completely exhausted. This methodology is generally necessary for container accounting purposes. Full water containers, however, may weigh in excess of 45 lbs. each. Hence, a significant weight imbalance may be imposed on one side of the vehicle because of the disproportionate number of full water containers. Shifts in the center of gravity to one side of the vehicle can cause significant vehicle suspension problems and/or excessive tire wear. Further, unbalanced steering may result, especially during vehicle turns where substantial centrifugal forces may be imposed on the vehicle.

Another problem associated with the assembled crate racks is that injury to delivery personnel commonly occurs during retrieval of full water containers. As above-described, full water containers often weigh in excess of 45 lbs. Hence, the potential for wrist, elbow, shoulder and, particularly, hyper-extended back injuries is substantially increased when delivery personnel are required to retrieve water containers positioned in the upper tiers of the array. Similarly, discogenic back injuries are potentially caused when delivery personnel are required to bend down to retrieve water containers from the lower tiers of the crate racks.

Further, to meet regular scheduling and/or irregular consumption demands, fully loaded storage arrays are usually preloaded atop the carrying pallets and stored outside in groups for easy access. Space and cost limitations often prevent these loaded pallets from being stored in warehouses, covered areas or the like. Thus, the containers, and more importantly the water stored therein, are subjected to environmental factors such as extreme temperature fluctuations. Moreover, the containers themselves accumulate dust and dirt particles thereon which degrades the appearance of the product and potentially creates health hazards.

Yet another problem associated with the crate rack system is that the two-deep crate storage methodology is burdensome to operate. To access the individual water containers stored in the rear row pallets, the front row empty crates or column of empty crates must be removed and/or reorganized to permit access. Often, the front empty crates are manually moved to adjacent storage bays so that the rear crates can be accessed. Subsequently, these moved crates must then be reshuffled back to the original storage bay. This task is laborious for the delivery personnel and may cause injury, especially later in the day when he or she is already fatigued. Moreover, this method is inefficient thereby resulting in decreased productivity.

In addition, fleet purchases of commercial vehicles incorporating these storage bays are generally not available. Standard flatbed vehicles usually position the flatbed portion too high above the ground which, in turn, places the upper tiers of the crate array out of reach of most delivery personnel. Hence, substantial chassis and frame modifications are necessary to lower the flatbed to an acceptable height. Further, custom fabrication of the storage bays is required to build these assemblies to proper specification (i.e., formed and dimensioned to receive a plurality of two-deep crate mounted racks). These modifications are not only costly, but are time consuming as well. Conversions often require up to six months to perform.

Attempts have been made to provide delivery vehicles with large fluid container handling and dispensing assemblies which reposition the containers at a safer dispensing height to absolve some the problems abovementioned. Typical of prior art fluid container dispensing apparatus for delivery vehicles are the apparatus disclosed in U.S. Pat. Nos. 4,260,072 to Quasarano; 3,141,537 to Dillaha; 2,244,524 to Lima; and 3,786,947 to Craft, each of which describes a delivery vehicle dispensing fluid containers at a more optimum position.

While these dispensing assemblies have been adequate to relocate the dispensing height of the fluid container to a safer level, several of the problems associated with the crate rack system are also inherent with these assemblies. For instance, these prior art dispensing assemblies all require substantial modification to the delivery vehicles in order to carry and support the dispensing assemblies thereon. Moreover, these prior art assemblies may experience weight imbalance problems when full fluid containers are removed from only one side of the vehicle in the systematic fashion noted.

DISCLOSURE OF INVENTION

Accordingly, it is an object of the present invention to provide a large container storing and dispensing module assembly for a vehicle which automatically and evenly distributes the cumulative weight of the large containers relative to the vehicle as the containers are dispensed therefrom.

It is a further object of the present invention to provide a large container storing and dispensing module assembly for a vehicle which dispenses the containers at an optimum height.

It is another object of the present invention to provide a large container storing and dispensing module assembly for a vehicle which potentially reduces injury to delivery personnel caused by container delivery.

Another object of the present invention to provide a large container storing and dispensing module assembly for a vehicle which is modular and can be mounted to standard commercial flatbed vehicles without substantial modification.

Still another object of the present invention is to provide a large container storing and dispensing module assembly for a vehicle which reduces exposure of the containers to environmental factors.

Yet another object of the present invention is to provide a large container storing and dispensing module assembly for a vehicle which reduces delivery vehicle mechanical problems caused by imbalance of the large containers carried thereon.

It is a further object of the present invention to provide a large container storing and dispensing module assembly for a vehicle which is durable, compact, easy to maintain, has a minimum number of components, is easy to use by unskilled personnel, and is economical to manufacture.

In accordance with the foregoing objects, the present invention includes a modular storing and dispensing assembly for storing and dispensing a plurality of large containers of substantial weight. The modular storing and dispensing assembly comprises a container support track mechanism supporting each of the containers and is formed for movement of each of the containers between a stored position and a dispensing station. An enclosure substantially encloses the container support track mechanism and all of the containers. A door is provided in an opening in the enclosure which is movable between a closed position and an open position permitting access to the containers situated at the dispensing station. The container support track mechanism and the enclosure are both coupled to a modular frame for movement of the container support track mechanism and the enclosure as a unit. The modular frame is formed for mounting on a vehicle and for use as a free-standing storing and dispensing unit.

In one alternative embodiment of the modular storing and dispensing assembly, the container support track mechanism includes a first track member formed to support the containers on a cylindrical side portion thereof. At least a portion of the first track member is inclined downwardly at an angle sufficient to induce gravitational movement of each container along the first track member from a receiving station toward the dispensing station. A second track member positioned above the first track member and is formed to support the containers on a cylindrical side portion thereof. Similarly, at least a portion of the second track member is inclined downwardly at an angle sufficient to induce gravitational movement of the containers from a loading station to a transferring station with the transferring station being positioned vertically above the receiving station of the first track member.

An energy absorbing guide mechanism is included for guiding movement of the containers from the transferring station to the receiving station. The guide means includes a first guide member movably mounted to the modular frame proximate the receiving station of the first track member for movement of the guide member between a receiving position and a displaced position. The receiving position is positioned for receipt of one of the containers during downward displacement thereof from the transferring station to the receiving station. The displaced position is situated for guiding of the one container from the guide member to the receiving station. An absorption mechanism is operably coupled to the guide member and resists movement to the displaced position. Hence, impacts of the one container against the guide member, which are caused during gravitational displacement of the one container from the transferring station to the receiving station, are absorbed.

In another embodiment of the modular storing and dispensing assembly, the container track support mechanism includes a conveyor mechanism mounted to the modular frame and extending about a predetermined path substantially along the full transverse dimension of a flatbed of the vehicle when the modular frame is releasably mounted thereto. The conveyor mechanism includes a conveyor drive mechanism and an elongated flexible conveyor transport device movably coupled to the drive mechanism for propelled movement about the predetermined path. A plurality of spaced-apart carrying trays are formed to carry at least one of the containers therein and are pivotally coupled to the conveyor transport device. Further, support tracks are provided which are rigidly mounted to the modular frame. Each support track is formed and positioned to engage and support the conveyor transport device for support of a substantially portion of the weight of the plurality of containers.

Accordingly, the present invention provides a modular storing and dispensing assembly for large containers which releasably mount to standard delivery vehicles. Each module includes a support track mechanism which positions and moves a plurality of large heavy containers in a direction transverse to the delivery vehicle which evenly distributes the cumulative weight thereof relative to the entire transverse dimension of the vehicle.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is a schematic side elevation view of delivery vehicle employing a plurality of modular storing and dispensing assemblies for large containers designed in accordance with the present invention.

FIG. 2 is an enlarged side elevation view of two modular storing and dispensing assemblies of FIG. 1 illustrating the ability to stack atop each other during storage.

FIG. 3 is an enlarged front elevation view (side elevation view when mounted to the delivery vehicle of FIG. 1) of a gravity feed rack-type modular storing and dispensing assembly designed in accordance with the present invention and mounted to a flatbed of the delivery vehicle.

FIG. 4 is side elevation view (rear elevation view when mounted to the delivery vehicle of FIG. 1), in cross-section, of the gravity feed rack-type mechanism taken substantially along the plane 4—4 of FIG. 3.

FIG. 5 is an enlarged side elevation view of a large container oriented on a cylindrical side portion thereof and engaged with alignment ribs of the gravity feed rack-type mechanism of FIG. 3.

FIGS. 6A and 6B show a series of fragmentary, enlarged side elevation views of the gravity feed rack-type mechanism of FIG. 3 and illustrating the operation of an energy absorbing guide mechanism designed in accordance with the present invention.

FIG. 7 is a fragmentary, enlarged front elevation view of the energy absorbing guide mechanism of FIG. 6A taken substantially along the line 7—7 of FIG. 6A.

FIG. 8 is a fragmentary, enlarged side end elevation view, in cross-section, of the gravity feed rack-type mechanism of FIG. 3 incorporating an elevator mechanism designed in accordance with the present invention.

FIG. 9 is a front elevation view, in cross-section, of the elevator mechanism taken substantially along the line 9—9 of FIG. 8.

FIG. 10 is a enlarged, side elevation view of the elevator mechanism of FIG. 8 illustrating the operation of the automatic loading mechanism and taken substantially along the bounded line 10—10 of FIG. 8.

FIG. 11 is a fragmentary, enlarged top plan view, partially broken away, of a container platform and the automatic loading mechanism of the elevator mechanism of FIG. 8.

FIG. 12 is an enlarged side elevation view (front elevation view when mounted to the delivery vehicle of FIG. 1), partially broken away, of a conveyor-type modular storing and dispensing assembly designed in accordance with the present invention and mounted to the flatbed of the delivery vehicle.

FIG. 13 is a front elevation view (side elevation view when mounted to the delivery vehicle of FIG. 1), in cross-section and partially broken away, of the conveyor-type mechanism taken substantially along the plane 13—13 of FIG. 12.

FIG. 14 is a enlarged, side elevation view of a gear device of the drive mechanism and taken substantially along the bounded line 14—14 of FIG. 12.

FIG. 15 is an enlarged, fragmentary, front elevation view of a load-bearing roller chain mechanism employed in the conveyor-type modular storing and dispensing assembly of FIG. 12 illustrating rolling engagement with a support track and taken substantially along the plane line 15—15 of FIG. 12.

FIG. 16 is a fragmentary top plan view of the load-bearing roller chain mechanism of FIG. 15.

BEST MODE OF CARRYING OUT THE INVENTION

The modular storing and dispensing assembly of the present invention provides a large container storing and dispensing module which releasably mounts to a standard delivery vehicle. Each module includes a support track mechanism which positions and moves a plurality of full fluid containers in a direction transverse to the delivery vehicle in an effort to evenly distribute the cumulative weight thereof relative to the entire transverse dimension of the vehicle. While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIG. 1, where a modular storing and dispensing assembly, generally designated 20, for a plurality of large fluid containers 21 is illustrated mounted to a flatbed portion 22 of a delivery vehicle 23 (both of which are shown in phantom lines). Briefly, in the broadest aspect of the present invention, modular assembly 20 includes container support track means 24 formed and dimensioned to store and move each container 21 between a stored position 25 (stored within modular assembly 20) and a dispensing station 26 (FIGS. 2 and 4). Large containers 21 may be dispensed from dispensing station 26 which is or can be adjusted to an optimum height suitable for container retrieval. Hence, injuries to delivery personnel, the back in particular, may be reduced. Further, support track means 24 are oriented so that the plurality of stored large containers 21 are entirely transverse to the flatbed portion 22 of vehicle 23 in order to evenly distribute weight thereacross.

An enclosure means, generally designated 27, substantially encloses support track means 24 and all containers. 21 supported thereon to shelter containers 21 from environmental exposure when modular assemblies 20 are stored outside° Both support track means 24 and enclosure means 27 are coupled to a modular frame member 32 for movement of support track means 24 and enclosure means 27 as a unit. Modular frame member 32 is formed for mounting on vehicle flatbed portion 22 and for use as a free-standing storing and dispensing unit. Therefore, these loaded modular assemblies 20 can be removably mounted to flatbed portion 22 where support track means 24 can be operated to dispense large containers 21. Further, enclosure means 27 of modular assembly 20 is particularly suitable for permitting stacking atop a similarly formed lower assembly 20, thereby saving space (FIG. 2).

A dispensing and loading opening 31 is formed at a front end of enclosure 27 to provide limited access to dispensing station 26. Enclosure means 27 includes door means 30 positioned in a opening 31 which is movable to an open position for access to dispensing station 26.

In one embodiment of the present invention, briefly, container support track means 24 is provided by a gravity feed rack-type mechanism, generally designated 33, as best shown in FIGS. 3–6. Rack-type mechanism 33 is formed to support and move each container 21 through the use of gravity from stored position 25 toward dispensing station 26. As each dispensed container 21(a-d)(1) is withdrawn from dispensing station 26, rack-type mechanism 33 automatically repositions and distributes the cumulative weight of the remaining stored containers 21 across the full transverse dimension of vehicle 23. More importantly, such distribution not only lowers the composite center of gravity (CG) but also centers the CG relative the transverse dimension of delivery Vehicle 23. This tends to reduce payload imbalance as each container 21a is dispensed therefrom. In contrast, the prior art dispensing assemblies were prone to substantial vehicle weight imbalance caused by a disproportionate number of full containers stored on one side of the delivery vehicle.

In another embodiment of the present invention, container support track means 24 is provided by a conveyor-type mechanism, generally designated 35. As viewed in FIGS. 12-16, conveyor-type mechanism 35 is formed to reposition and move a plurality of container support trays 36, which are formed to carry stored containers 21, around a predetermined path 34 to selected positions. Hence, individual stored containers 21 can be easily accessed when stored within enclosure means 27 by repositioning the corresponding support tray 36 at dispensing station 26. Here, a particular container can be retrieved and withdrawn from dispensing and loading opening 31. Moreover, support trays 36 fully loaded with containers 21 can be repositioned along predetermined path 34 relative the transverse dimension of vehicle 23 to reposition and distribute the overall cumulative weight of full containers 21a stored therein. As stated, this distribution lowers and centers the overall cumulative CG to reduce payload imbalance.

In accordance with the present invention, modular storing and dispensing assemblies 20 are formed and dimensioned for releasable mounting directly to flatbed portion 22 (FIG. 1) of the standard delivery vehicle 23. The delivery vehicles typically employed include flatbeds portions 22 with transverse dimensions of approximately eight feet across and having carrying capabilities of up to 26,000 lbs. Likewise, as shown in FIG. 4, the width of the side of modular assembly 20 is sized to fit within this dimension. Hence, unlike the dispensing assemblies of the prior art, no substantial chassis or flatbed frame modifications to delivery vehicle 23 are required to releasably mount modular assembly 20 to flatbed portions 22. The present invention, therefore, provides substantial time and cost savings because off-the-lot fleet purchases of delivery vehicles 23 can be quickly prepared for immediate utilization.

As best viewed in FIG. 1, preferably at least three individual modular storing and dispensing assemblies 20 (incorporating either rack-type mechanism 33 and/or conveyor-type mechanism 35 or any combination thereof) may be carried and releasably mounted in a side-by-side relation to flatbed portion 22. To orient modular assembly 20 such that support track means 24 extend substantially transverse to vehicle 23, a front end (i.e., dispensing and loading opening 31) faces outwardly from one side (preferably the passenger side) of vehicle 23.

Each modular assembly 20 includes modular frame member 32 having a plurality of mounting posts 40 extending downwardly from a bottom portion thereof. As shown in FIGS. 1, 3 and 4, mounting posts 40 are situated in a spaced-apart relation proximate the four corners of frame member 32 and are aligned to engage standard mounting recesses 41 provided in flatbed portion 22. Various fasteners or pins (not shown) may be employed to releasably secure posts 40 in mounting recesses 41.

Hence, modular assemblies 20, carrying either rack-type mechanisms 33 or conveyor-type mechanisms 35, can be removably, yet securely, mounted to flatbed portion 22 without requiring substantial modification to flatbed portion 22. This considerably facilitates modularity since assemblies 20 need merely be positioned atop flatbed portion 22 and aligned with corresponding mounting recesses 41 which are formed and dimensioned for releasable receipt of mounting posts 40.

In the preferred form, a plurality of post receiving cavities 42 (FIG. 2) are provided in a top surface 43 of enclosure means 27 of lower modular assembly 20. Cavities 42 are spaced-apart in a pattern substantially similar to the spacing between mounting recesses 41 of flatbed portion 22. Hence, cavities 42 are positioned to receive the mounting posts 40 of a similarly formed and dimensioned upper modular assembly 20 stacked thereatop. As shown in FIG. 2, this mating engagement between mounting posts 40 of upper modular assembly 20 and the corresponding cavities 42 of lower modular assembly 20 enable secured stacking therebetween.

To facilitate lifting and maneuverability of modular assemblies 20, modular frame member 32 preferably includes forklift brackets 37 (FIGS. 3 and 9) which are aligned and formed to receive standard forks of forklift vehicles (not shown). Although forklift brackets 37 may be mounted to lower portions of frame member 32, as shown in FIGS. 3 and 9, it is preferable to mount brackets 37 to upper portions of modular frame member 32 just above dispensing and loading opening 31. Therefore, brackets 37 enable simple lifting of assembly 20 so that it may be positioned atop flatbed portion 22 or a lower assembly 20.

Further, in the preferred form, door means 30 is of the beverage-door or garage-door type. FIGS. 1, 3 and 4 illustrate that door means 30 includes a plurality of sectioned panels 44 adjacently disposed in a side-by-side relation and pivotally coupled together at adjacent side portions thereof. Each panel 44 is slidably (or rollably) mounted at opposite ends thereof to spaced-apart rail members 45, 45' which cooperate with panels 44 to enable the same to open and close as a unit. Further, door means 30 may include an automatic latching device (not shown) which is biased in the locked position to automatically lock door means 30 over opening 31 when the door is drawn shut. It will be understood, however, that any closure device may be used to cover dispensing and loading opening 31 without departing from the true spirit and nature of the present invention.

Turning now to FIGS. 3-6, the gravity feed rack-type mechanism 33 constructed in accordance with the present invention will be described in greater detail. To aid storage efficiency, each rack-type storing and dispensing assembly 20 may be fitted with at least four individual rack-type mechanisms 33(a-d) laterally and vertically aligned in an array relative the dispensing and loading opening 31. Rack-type mechanisms 33(a-d) are substantially identical structures which all position dispensing stations 26(a-d) at opening 31. However, to reduce confusion and for the ease of description, only lower rack-type mechanism 33a will be described in great detail heretofore.

As above-indicated, once each dispensed container 21a(1) is removed from dispensing station 26a, rack-type mechanism 33a automatically and evenly distributes the weight of the plurality of stored containers 21a across the full transverse dimension of flatbed portion 22 of delivery vehicle 23.

FIGS. 3 and 4 illustrates that modular frame member 32 includes a plurality substantially vertically extending beam members 46 upon which rack-type mechanism 33a is supported. Rack-type mechanism 33a includes a first elongated track member 47a inclined downwardly across the full transverse dimension of flatbed portion 22 from a receiving station 50a to dispensing station 26a. Further, first track member 47a is inclined downwardly toward dispensing station 26a at an angle sufficient to induce gravitational movement of stored containers 21a supported on first track member 47a. Therefore, stored containers 21a positioned between receiving station 50a and dispensing station 26a gravitate toward dispensing station 26a upon removal of each dispensed container 21a(1) placed at dispensing station 26a.

It will be appreciated that rack-type mechanism 33a is particularly well suited to support cylindrically shaped containers 21a on a cylindrical side portion thereof, as shown in FIG. 5. First track member 47a is formed to provide rolling support of containers 21a and, therefore, does not require a very steep inclination to induce gravitational rolling movement of stored containers 21a toward dispensing station 26a. In contrast, square shaped containers 21s, as shown in FIG. 13, would require a much steeper inclination. Track member 47a, however, could include roller members (not shown) which aid gravitational movement toward dispensing station 26a.

Similar to first track member 47a, rack-type mechanism 33a preferably includes a second elongated track member 51a extending substantially along the full transverse dimension of flatbed portion 22a from a loading station 52a downwardly toward a transferring station 53a. The inclination of second track member 51a toward transferring station 53a, similarly, is sufficiently angled to induce gravitational rolling movement of containers 21a toward transferring station 53a. FIGS. 4, 6A and 6B illustrate that transferring station 53a is situated substantially vertically above receiving station 50a of first track member 47a so that large containers 21a can gravitationally transfer from second track member 51a to first track member 47a.

In the preferred form, loading station 52a is also situated substantially vertically above dispensing station 26a so that second track member 51a is vertically aligned above first track member 47a. Therefore, as shown in FIG. 4, second track member 51a gravitationally urges containers 21a supported thereon from right to left toward transferring station 53a until container 21a is transferred to receiving station 50a upon which first track member 47a gravitationally urges containers 21a from left to right toward dispensing station 26a. Accordingly, first and second track members 47a and 51a, respectively, cooperate to distribute the cumulative weight of stored containers 21a supported thereon across the full transverse dimension of flatbed portion 22 which promotes balance.

A plurality of alignment grooves 54a extend longitudinally along first track member 47a from receiving station 50a to dispensing station 26a and along second track member 51a from loading station 52a to transferring station 53a. As viewed in FIGS. 5 and 7, grooves 54a are selectively spaced-apart and formed to receive rib members 55a of containers 21a extending circumferentially around the cylindrical side portions thereof. Rolling receipt of rib members 55a in grooves 54a provide alignment of containers 21a as they roll along first track member 47a and second track member 51a.

In accordance with the present invention, an energy absorbing guide mechanism (FIGS. 4, 6A and 6B, and generally designated 56a) is preferably provided for guiding vertical gravitational transfer of containers 21a from transferring station 53a to receiving station 50a and for reducing damage caused by impact thereagainst. Because of the substantial mass of each full container 21a, the momentum developed by transferring containers 21a(2) as they roll from loading station to transferring station can be considerable. This is particularly true when initially loading an empty rack-type mechanism 33a since containers 21a are able to roll the full span of second track member 51a. The impact sustained, during free-fall of transferring containers 21a(1) from second track member 51a to first track member 47a can sometimes be damaging to rack-type mechanism 33a and/or container 21a. Accordingly, in an effort to reduce potential damage, it has been found advantageous to absorb this impact.

FIGS. 6A and 6B illustrate that energy absorbing guide mechanism 56a includes an upwardly facing first guide member 60a and an opposing downwardly facing second guide member 61a which cooperate to transfer containers 21a from transferring station 53a to receiving station 50a. Preferably, both guide members 60a and 61a, positioned together at the ends of first track member 47a and second track member 51a and extending substantially across the transverse dimension thereof (FIG. 7), are semi-cylindrical shaped shell portions having an arc segment of approximately 90° each.

As best viewed in FIGS. 6A and 6B, a lower end portion of first guide member 60a is pivotally mounted at opposed ends between far left vertical beam members 46' (FIG. 7) about a substantially horizontal first pivotal axis 62a positioned proximate receiving station 50a. First guide member 60a pivotally moves between a receiving position 63a (FIG. 6A), which is positioned for receipt of a free-falling transferring container 21a(2), and a displacing position 64a (FIG. 6B) which has caught transferring container 21a(2) and absorbed its impact thereagainst. Incidently, first pivotal axis 62a is positioned sufficiently close to the upper end of first track member 47a to permit transfer thereacross.

First guide member 60a further includes absorption means 65a operably coupled thereto which biases first guide member 60a toward the receiving position 63a and which resists pivotal motion about first pivotal axis 62a toward the displacing position 64a. Absorption means 65a includes a compression spring 66a having one end abutting a support member 67a of modular frame member 32 and having an opposite end abut a bottomside of first guide member 60a. A spring guide 70a facilitates guidance of compression spring 66a during reciprocal movement of first guide member 60a.

In accordance with the present invention, energy absorbing guide mechanism 56 includes stop means which prevents transfer of all containers 21a(3) subsequent to transferring container 21a(2) when transferring container 21a(2) is positioned in and against first guide member 60a. Hence, these upper subsequent containers 21a(3) will not back up against lower stored containers 21a supported in first track member 47a. Such back up sometimes causes dispensing problems for dispensed containers 21a(1) being retrieved from dispensing station 26a.

In the preferred embodiment, second guide member 61a performs the stop function by closing the passageway at transferring station 53a which prevents subsequent containers 21a(3) from dropping down to receiving station 50a. As best viewed in FIGS. 6A, 6B and 7, an upper end portion of second guide member 61a is pivotally mounted between rear vertical beam members 46' about a substantially horizontal second pivotal axis 71a which is positioned above transferring station 53a. Second guide member 61a moves between a normal position 72a (FIG. 6A), where the passageway is open to permit transferring container 21a(2) to pass therethrough, and a stopping position 73a (FIG. 6B), where second guide member 61a prevents subsequent container 21a(3) from passing therethrough.

When second guide member 61a is situated in the normal position 72a, first guide member 60a is situated in the receiving position 63a, as viewed in FIG. 6A. Similarly, when second guide member 61a is situated in the stopping position 73a, first guide member 60a is situated in the displacing position 64a, as viewed in FIG. 6B. Accordingly, first and second guide members 60a and 61a, respectively, are sequenced to reciprocate between the above-mentioned positions. Cooperation between first and second guide members 60a and 61a is provided by coupling means 74a which physically couples first guide member 60 to second guide member 61. Coupling means 74a includes a pair of spaced-apart coupling rods 75a and 75a' (FIGS. 6A, 6B and 7) pivotally mounted at opposite ends to corresponding side portions of first and second guide members 60a and 61a. A lower end of each coupling rod 75a, 75a' is pivotally mounted proximate a corresponding lower end portion of first guide member 60a while each upper opposite end of coupling rod 75a, 75a' is pivotally mounted to a corresponding lower end of second guide member 61a.

Accordingly, as transferring container 21a(3) departs from transferring station 53a and free falls toward receiving station 50a, the cylindrical side portion of container 21a(2) impacts a topside of first guide member 60a while it is situated in the receiving position 63a. Subsequently, absorption means 65a resists the impact and pivotal displacement of first guide member 60a about first pivotal axis 62a as it moves toward the displacing position 64a. In turn, coupling rods 75a, 75a' simultaneously draw second guide member 61a toward stopping position 73a which prevents subsequent containers 21a(3) from passage therethrough. As viewed in FIG. 6B, gravity then urges transferring container 21a(2) forward toward receiving station 50a and onto first track member 47a. Once transferring container 21a(2) leaves first guide member 60a, compression spring mechanism 66a urges the same back toward receiving position 63a where coupling rods 75a, 75a' push second guide member 61a about second pivotal axis 71a and back towards the normal position 72a.

In one embodiment of rack-type mechanism 33a, a release mechanism 76a is provided which permits withdrawal and retrieval of dispensed container 21a(1) positioned at dispensing station 26a. More importantly, release mechanism 76a, as shown in FIGS. 3 and 4, prohibits passage of subsequent stored containers 21a through dispensing station 26a so that rack-type mechanism 33a will not be inadvertently emptied. Release mechanism 76a preferably is manually operable and includes a retaining bar 80a transversely disposed across both dispensing container 21a(1) and dispensing station 26a. Accordingly, passage of dispensed container 21a(1) is prohibited through dispensing station 26a and can only be withdrawn when retaining bar 80a is repositioned away from dispensing station 26a.

Retaining bar 80a extends from a rod member 81a upon which bar 80a pivots between a retaining position (solid lines in FIG. 4), preventing removal of dispensing container 21a(1) from dispensing station 26a, and a retrieving position (phantom lines in FIG. 4) permitting retrieval and withdrawal of dispensing container 21a(1) from dispensing station 26a. Preferably, rod member 81a is pivotally mounted at opposite ends to portions of frame member 32 (not shown) proximate dispensing and loading opening 31 which permit bar 80a to pivot about the substantially horizontal longitudinal axis of rod member 81a. FIG. 4 illustrates that retaining bar 80a includes extension brackets 79a, 79a' which positions retaining bar 80a outwardly and downwardly from rod member 81a to a position just forward of dispensing container 21a(1), when oriented in the retaining position (solid lines). As retaining bar 80a is manually pivoted away from dispensed container 21a and dispensing station 26a toward the retrieving position (phantom lines in FIG. 4), dispensing container 21a(1) will be permitted to pass through dispensing station 26a.

To prevent uncontrolled advancement of all subsequent stored containers 21a positioned behind dispensing container 21a(1) and supported by first track member 47a, a biasing mechanism, coupled to rod member 81a, biases retaining bar 80a toward the retaining position. However, in order to assure non-passage, the biasing mechanism must be of a sufficient torsional property to quickly urge retaining bar 80a toward the retaining position (solid lines in FIG. 4) from the retrieving position (phantom lines in FIG. 4). Such characteristic may be provided by a helical spring or the like which acts about the longitudinal axis of rod member 81a. Hence, once retaining bar 80a is manually lifted toward the retrieving position where dispensing container 21a(1) can be subsequently withdrawn, the biasing mechanism quickly moves bar 80a back to the retaining position upon manual release of bar 80a.

It will be appreciated that adjacent release mechanisms 76(a,c), or 76(b,d) provided for adjacent rack-type mechanisms 33(a,c), or 33(b,d), respectively, can be operably coupled together so that two dispensing containers 21(a,c), or 21(b,d) can be withdrawn simultaneously. A simple sliding sleeve bracket (not shown) or the like may removably couple retaining bars 80(a,c), or 80(b,d) rigidly together. Accordingly, manual operation of one bar will simultaneously lift the retaining bar of the adjacent release mechanism as well.

In another embodiment of rack-type mechanism 33, an elevator mechanism 83 capable of vertical movement along the dispensing and loading opening 31 of enclosure means 27 is provided. As best shown in FIGS. 8–11, elevator mechanism 83 is particularly suitable for rack-type storing and dispensing modular assemblies 20 carrying four rack-type mechanisms 33(a–d) aligned in an array as mentioned above. Accordingly, elevator mechanism 83 is capable of selective vertical positioning between dispensing stations 26(a,c), of lower rack-type mechanisms 33(a,c) (phantom lines in FIG. 8), and loading stations 52(b,c), of upper rack-type mechanisms 33(b,d) (solid lines in FIG. 8).

Elevator mechanism 83 includes a container carrying device 84 formed to carry at least two containers 21 on a cylindrical side portion thereof in a front-to-back orientation (FIG. 9). As will be described below, container carrying device 84 is movably mounted to a drive mechanism 85 which drives container carrying device 84 between dispensing stations 26(a,c) and loading stations 52(b,d). Moreover, container carrying device 84 can be selectively positioned between the lower and upper rack-type mechanisms to facilitate: container dispensing from dispensing stations 26(a-d); container loading onto rack-type mechanisms 33(a-d) of corresponding loading stations 52(a-d); or for container repositioning to an optimum vertical level in dispensing and loading opening 31 for retrieval by delivery personnel.

Container carrying device 84 includes a platform 86 rigidly mounted at opposed sides ends to support brackets 87 and 87'. In turn, each support bracket 87, 87' is coupled at drive mounts 90 to an elongated flexible elevator transport member 91, 91' (FIG. 10) extending vertically along opposing sides of dispensing and loading opening 31. Elevator transport members 91, 91' are employed to support and move container support 84 vertically along opening 31. Further, elevator transport members 91, 91' represent a portion of drive mechanism 85 and may be provided by a variety of flexible transport mechanisms such as chains, belts, cables, ropes or the like. However, transport members 91, 91' are preferably linkage chain members 91, 91', as shown in FIG. 10, which are drivably and operably coupled to upper pulleys 92, 92' and lower pulleys 93, 93'. Upper pulleys 92, 92' are suspended and mounted at opposed ends to a substantially horizontal upper pulley rod 94 while lower pulleys 93, 93' are suspended and mounted at opposed ends to a substantially horizontal lower pulley rod 95. Upper and lower pulley rods 94 and 95, which cooperate to drive container carrying device 84 vertically relative dispensing and loading opening 31, are rotatably mounted at opposed ends to portions of frame member 32. At least one pulley rod is rotatably mounted to a motor (not shown), such as a conventional electric motor, which drives the pulley rod to move drive chains 91, 91'.

Accordingly, container carrying device 84 can be selectively positioned vertically between dispensing stations 26(a,c), of lower rack-type mechanisms 33(a,c), and loading stations 52(b,d), of upper rack-type mechanisms 33(b,d). This aspect is particularly helpful when the loading station is positioned high relative to the delivery personnel.

In the preferred form of elevator mechanism 83, an automatic loading mechanism 96, as shown in FIGS. 10 and 11, is provided which automatically loads full or empty containers 21 into second track members 51(a-d) by virtue of positioning container carrying device 84 at loading stations 52(a-d). Preferably, however, loading mechanism 96 will only be operable for the upper rack-type mechanisms 33(b,d) since the lower rack-type mechanisms 33(a,c) are easily more accessible.

Loading mechanism 96 includes a plurality of fingers 100 extending radially outward from a camming rod 101 positioned laterally across container carrying device 84. Camming rod 101 is pivotally mounted at opposed ends to container carrying device 84 so that fingers 100 can pivot about a substantially horizontal longitudinal axis of camming rod 101 between a normal position (phantom lines in FIG. 10), permitting receipt of containers 21 in support platform 86, and a loading position (solid line in FIG. 10), which loads containers 21 into second track member 51(b,d) at upper loading stations 52(b,d). In the normal position, fingers 100 lie substantially flush and coplanar with support platform 86. However, when fingers 100 pivot about camming rod 101, fingers 100 extend through aligned slots 102 provided in support platform 86 to allow fingers 100 to extend therethrough and engage the cylindrical side portions of containers 21. Accordingly, as shown in FIG. 10, as fingers 100 move toward the loading position (solid lines), container 21 is transferred from container carrying device 84 into second track members 51b or 51d.

To activate loading mechanism 96, when container carrying device 84 is positioned proximate upper loading stations 52(b,d), a latch cam 103 is provided which extends radially outward from camming rod 101 and is angularly inclined relative fingers 100. Latch cam 103 is oriented in an upwardly inclined manner (phantom lines in FIG. 10), when fingers 100 are oriented in the normal position, and situated to engage a camming block 104 mounted to front vertically extending beam member 46'. As drive mechanism 85 moves container carrying device 84 toward upper loading stations 52(b,d), latch cam 103 engages camming block 104 which causes camming rod 101 to pivot fingers 100 about its longitudinal axis from the normal position toward the loading position. Fingers 100, hence, automatically place containers 21, seated in container carrying device 84, into second track members 51(b,d) of upper rack-type mechanisms 33(b,d).

To assure proper placement and positioning of container carrying device 84 relative dispensing and loading opening 31, elevator mechanism 83 may include a plurality of location switches (not shown) which automatically disengage drive mechanism 85 when activated. This may limit the vertical movement of container carrying device 84 along dispensing and loading opening 31 (e.g., near upper loading stations 52(b,d)) to reduce container carrying device 84 damage should the delivery technician error. As a further precaution and in the preferred form, elevator mechanism 83 is manually operable by the delivery technician using two independent buttons (not shown) for safety purposes. A first button may be operably coupled to the elevator motor (not shown) for starting of the motor and the second button would require engagement, while continually engaging the first button, to activate elevator drive mechanism 85. This dual engagement requirement is a precaution against inadvertent operation of drive mechanism 85 which could be potentially damaging. In addition, drive mechanism 85 could be programmed to render the buttons inoperable when door means 30 is moved to the closed position.

Turning now to FIGS. 12-16, the conveyor-type dispensing assembly 35 will be described in detail henceforth. As above-indicated and in accordance with the present invention, one embodiment of container support track means 24 is provided by conveyor-type mechanism 35 which is formed to reposition, move and carry a plurality of stored containers 21 around a predetermined path 34 to selected positions therealong. Hence, selective containers 21 can be easily accessed from stored position 25 within enclosure means 27 by repositioning the corresponding support tray 36, carrying container 21, to dispensing station 26. This aspect is particularly beneficial in the large container beverage delivery business since different sized containers and/or a variety of beverages can be retrieved from stored position 25 with feasibility and minimal effort. Once the particular support tray 36 is moved to an optimum vertical position along dispensing and loading opening 31 at dispensing station 26, container 21 can be manually retrieved and withdrawn therefrom. Moreover, partially or fully loaded support trays 36 can be repositioned along predetermined path 34 relative the transverse dimension of vehicle 23 (and flatbed 22) to reposition and distribute the overall cumulative weight of full containers 21 stored therein. As stated, this distribution lowers and centers the overall cumulative CG to reduce payload imbalance.

As best viewed in FIGS. 12 and 13, support trays 36 are movably mounted to a conveyor drive mechanism 105 which drives support trays 36 together as a unit around path 34. Drive mechanism 105 includes a plurality of pairs of spaced-apart idler sprockets 106, 106' strategically situated to define predetermined path 34. Each pair of idler sprockets 106, 106' are rotatably mounted to opposite ends of conveyor idler rod 107. Rod 107 is oriented substantially horizontally and extend laterally from one side of frame means 32 to the other side. Preferably, rod 107 is rotatably mounted at opposite ends to vertically extending beam members 46 of frame means 32 so that idler sprockets 106, 106' can rotate about the longitudinal axis thereof.

Drive mechanism 105 further includes a pair of spaced-apart flexible transport chains 111, 111' cooperatively coupled to corresponding idler sprockets 106, 106'. As best viewed in FIG. 14, the idler sprockets are preferably provided by rigid teethed gears 106 (106' not shown) which securely mesh with corresponding transport chains 111, 111' for slip-free movement. Hence, transport chains 111, 111', moved by teethed gears 106, 106', cooperate to drive support trays 36 around predetermined path 34.

Contiguous idler sprockets 106, 106' are transversely positioned relative to frame means 32 (and enclosure 27) in an orientation which directs predetermined path 34 substantially transverse to vehicle 23 when container assembly 20 is mounted to flatbed portion 22. Further, idler sprockets 106, 106' are alternately, vertically positioned relative to frame means 32 which causes predetermined path 34 to journey back and forth through substantial horizontal elongated spans between consecutive idler sprockets 106, 106'. As viewed in FIG. 12, such configuration forms essentially a switch-back path 34 which considerably facilitates packing density in the space provided by enclosure 27. Moreover, the cumulative weight of the payload can be distributed more evenly transversely across flatbed 22 to reduce imbalance. It will be understood, however, that other predetermined paths may be provided which extend substantially transverse to vehicle 23 without departing from the true spirit and nature of the present invention.

Predetermined path 34 further includes a substantially vertical path portion 112 which moves support trays 36 vertically through dispensing and loading opening 31. Trays 36 can be vertically positioned anywhere therealong which enables easy container retrieval which reduces potential injury. Vertical guide tracks 113, 113' (FIGS. 12 and 13) are mounted vertically along opposite sides of dispensing and loading opening 31. Guide tracks 113, 113' slidably receive transport chains 111, 111' which helps guide transport chains 111, 111' and support trays 36 suspended therebetween through opening 31 along path 34.

As stated, conveyor-type assembly 35 includes a plurality of equally spaced support trays 36 around predetermined path 34. Support trays 36 preferably extend laterally across enclosure means 27 (front-to-rear relative to vehicle 23) and provide container receiving wells 114 which are formed and dimensioned to carry containers 21 on side portions thereof. As FIG. 13 illustrates, receiving wells 114 are best suited to carry either three 3 gallon square containers 21a or two 5 gallon cylindrical containers 21c. However, customized trays could be manufactured to carry and support a variety of containers and goods therein.

Each support tray 36 includes suspension brackets 115, 115' mounted to opposite ends of receiving well 114 so that support tray 36 can be pivotally suspended between transport chains 111 and 111'. Each support bracket 115, 115' includes a pivotal joint 116, 116' (FIGS. 15 and 16) extending outwardly therefrom which pivotally mounts suspension brackets 115, 115' about common axis to transport chains 111, 111', respectively. Support trays 36, thus, pivot relative to transport chains 111, 111' which is necessary for trays 36 to carry containers 21 in an upright manner when moving about idler sprockets 106, 106'. Moreover, this feature is particularly helpful when vehicle 23 is making abrupt or long sweeping turns. During these motions, centrifugal forces cause containers 21 to roll out of receiving wells 114. Because of the pivotal nature and orientation of joints 116, 116', however support trays 36 pivot outwardly away from the axis of rotation. Accordingly, this counteracting centripetal force substantially reduces container 21 roll out and further secure containers 21 therein.

A most important aspect of these modular container assemblies 20 is their ability to carrying large containers of substantial mass. Hence, in accordance with the present invention, conveyor-type assembly 35 includes support means 117 which vertically supports a substantial portion of the weight of containers 21 carried by support trays 36. Unsupported horizontal spans of path 34, between contiguous idler sprockets 106, 106', would be problematic since the extreme cumulative weight of containers 21 would cause substantial dipping of transport chains 111, 111' therebetween. Moreover, an unsupported structure would exert considerable tension forces on transport chains 111, 111' as well as potentially over-stressing corresponding idler sprockets 106, 106'.

Therefore, the present invention incorporates support means 117 therebetween which, as shown in FIGS. 12, 15 and 16, are provided by a plurality of pairs of spaced-apart elongated load-bearing rails 120, 120' positioned along each substantially horizontal span of path 34 Load bearing rails 120, 120', thus, extend between each contiguous drive wheel 106, 106', except along vertical path portion 112. Hence, rails 120, 120' are strategically positioned to provide movable support to transport chains 111, 111' as each portion passes therealong.

Load-bearing rails 120, 120' are preferably rigidly mounted to vertically extending beam members 46 of frame means 32, which transfer a substantial portion of the cumulative container weight from rails 120, 120' through to beam members 46. Rails 120, 120' include upwardly facing elongated planar surfaces 121, 121' which are formed to engage respective transport chains 111, 111'. Such engagement provides vertical support to engaging portions of transport chains 111, 111' and to corresponding supporting trays 36, as drive mechanism 105 moves the same along predetermined path 34.

In the preferred embodiment, transport chains 111, 111' are provided by load-bearing roller chains which provides rolling support during engagement along rails 120, 120', respectively. As best viewed in FIGS. 14 and 15, each link 122 of roller chains 111, 111' includes an individual roller member 123 rotatably mounted about a roller axis 124. Roller axis 124 are aligned to rotate roller members 123 in directions longitudinally along roller chains 111, 111' so that they can provide rolling support along rails 120, 120'. Hence, as roller chain 111 is released from cooperative engagement with teethed gear 106 (FIG. 14), roller members 123 rollably engage planar surface 121 which provides substantial rolling support along each horizontal span of predetermined path 34.

It will be understood, that load-bearing roller chains themselves are well known in the art and do not constitute a novel feature of the present invention. However, the cooperation between these load-bearing roller chains and the support brackets over the substantial length between the idler sprockets is unique.

A pair of drive wheels 108, 108' spaced-apart and rotably mounted to the opposing ends of a drive shaft 109 are movably coupled to conveyor motor means 125 which powers wheels 108, 108' to drive transport chains 111, 111'. As viewed in FIGS. 12 and 13, motor means 125 is preferably mounted to a motor support platform 126 and positioned proximate dispensing and loading opening 31. Motor means 125 can be any conventional electric or hydraulic motor and is rotatably coupled to drive wheel 108 by belt 127, chain, cable, rope or the like.

In the preferred embodiment, motor means 125 is manually operable by the delivery technician using two independent buttons (not shown) for safety purposes. A first button may be operably coupled to motor means 125 for starting of the motor and the second button would require engagement, while continually engaging the first button, to activate conveyor drive mechanism 105. This dual engagement requirement is a precaution against inadvertent operation of drive mechanism 105 which could be potentially damaging. In addition, drive mechanism 105 could be programmed to render the buttons inoperable when door means 30 is moved to the closed position.

Finally, as viewed in FIGS. 12 and 13, frame means 32 preferably includes forklift brackets 37 positioned at upper portions thereof so that container assembly 20 can be moved by a forklift vehicle (not shown). Forklift brackets 37 could have just as easily been positioned at a lower portion of frame means 32, as in rack-type mechanism 33, however. Further, conveyor-type assembly 35 includes flatbed mounting posts 40 which engage mounting openings 41 in a manner substantially similar to that of rack type assembly 33.

What is claimed is:

1. A modular storing and dispensing assembly for storing and dispensing a plurality of large containers of substantial weight comprising:
    a modular frame formed for removable mounting transversely on an elongated flatbed of a vehicle, and for use as a free-standing storing and dispensing unit;
    an enclosure device defining a cavity and an access opening into said cavity, and including a door positioned in said access opening for movement between a closed position and an open position for access into said cavity, said enclosure device being coupled to said modular frame in an orientation positioning said access opening at a side portion of said flatbed when said modular frame is mounted to the vehicle;
    a conveyor assembly positioned in said cavity, and mounted to one of said modular frame and said enclosure device, said conveyor assembly including a plurality of spaced-apart carrying trays each being formed for supportive receipt of at least one of said containers therein, and an elongated flexible transport mechanism formed for selective movement of said trays about a predetermined path in said enclosure device substantially along the full transverse dimension of said flatbed between a stored position and a dispensing station proximate said access opening, said carrying trays being coupled to said transport mechanism for pivotal movement about substantially horizontal axes aligned substantially in the longitudinal direction of said elongated flatbed to counteract centrifugal forces acting on said containers during turning of said vehicle.

2. The modular storing and dispensing assembly as defined in claim 1 wherein,
    said enclosure device includes a top surface formed and dimensioned for stacking of a similarly formed and dimensioned second modular storing and dispensing assembly thereatop.

3. The modular storing and dispensing assembly as defined in claim 2 wherein,
    said modular frame includes a mounting device proximate a bottom portion thereof for releasable mounting to said flatbed of the vehicle.

4. The modular storing and dispensing assembly as defined in claim 3 wherein,
    said mounting device includes a plurality of spaced-apart mounting posts extending downwardly from a bottom surface of said enclosure device.

5. The modular storing and dispensing assembly as defined in claim 4 wherein,
    said top surface of said enclosure device defines a plurality of post receiving cavities, each one of said plurality of cavities being positioned vertically opposite a corresponding mounting post, said post receiving cavities being formed and dimensioned to receive similarly formed mounting posts of said second enclosure device.

6. The modular storing and dispensing assembly as defined in claim 1 wherein,
    said conveyor assembly further includes:
    (1) a conveyor drive mechanism coupled to said transport mechanism for propelled movement of said trays about said predetermined path; and
    (2) a support assembly rigidly mounted to said frame, and formed and positioned to engage and support said conveyor transport mechanism for support of a substantially portion of a weight of said containers.

7. The modular storing and dispensing assembly as defined in claim 6 wherein,
    said drive mechanism includes a plurality of drive members movably mounted to said frame and positioned at strategic locations to define said predetermined path and to guide said transport mechanism therealong.

8. The modular storing and dispensing assembly as defined in claim 7 wherein,
    each said drive member is provided by a pair of spaced-apart idler sprockets mounted to opposed ends of a respective axle member for rotational motion about a longitudinal axis thereof, said axle members further being axially disposed across said modular frame means in direction substantially perpendicular to the movement of said transport mechanism.

9. The modular storing and dispensing assembly as defined in claim 8 wherein, said flexible conveyor transport mechanism is provided by a pair of spaced-apart load-bearing chain members frictionally engaging said respective idler sprockets for propelled movement along said predetermined path, and said carrying trays each including a pair of spaced-apart suspension brackets each being pivotally mounted to corresponding chain members to suspend said carrying tray therebetween.

10. The modular storing and dispensing assembly as defined in claim 9 wherein, said support assembly includes at least one pair of spaced-apart elongated load-bearing rails extending substantially longitudinally along selected regions of said predetermined path between contiguous idler sprockets and defining respective upward facing surfaces formed to engage and support respective load-bearing chain members.

11. The modular storing and dispensing assembly as defined in claim 7 wherein, at least one said drive member is operably coupled to conveyor motor means for driving said transport mechanism along said predetermined path.

12. The modular storing and dispensing assembly as defined in claim 7 wherein, said support assembly includes at least one elongated support track extending substantially longitudinally along selected regions of said predetermined path between contiguous drive members and defining an upward facing surface formed to engage and support said conveyor transport mechanism.

13. The modular storing and dispensing assembly as defined in claim 12 wherein, said selected regions include the substantially horizontal regions between said contiguous drive members.

14. The modular storing and dispensing assembly as defined in claim 13 wherein, said flexible conveyor transport mechanism is provided a load-bearing chain member including a plurality of spaced-apart rollers rotatably mounted longitudinally therealong, said chain member providing rolling support and formed for rolling engagement with said support track.

* * * * *